United States Patent
Saito et al.

(10) Patent No.: US 6,577,940 B2
(45) Date of Patent: Jun. 10, 2003

(54) SHIFT CONTROL APPARATUS OF AUTOMATIC TRANSMISSION FOR VEHICLE

(75) Inventors: Yoshiharu Saito, Saitama (JP); Yasushi Inagawa, Saitama (JP); Takanori Kon, Saitama (JP); Hitoshi Kondou, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/902,980

(22) Filed: Jul. 11, 2001

(65) Prior Publication Data

US 2002/0022549 A1 Feb. 21, 2002

(30) Foreign Application Priority Data

Jul. 12, 2000 (JP) .......................................... 2000-211117

(51) Int. Cl.$^7$ .......................... B60K 31/00; F16H 61/04; F16H 9/00
(52) U.S. Cl. .............................. 701/59; 701/51; 701/54; 477/43
(58) Field of Search ............................... 701/59, 51, 61, 701/54, 64, 69, 48, 58, 66; 477/43, 154, 143, 155, 107, 110, 115, 34, 144, 146, 148, 129

(56) References Cited

U.S. PATENT DOCUMENTS 5,151,858 A * 9/1992 Milunas et al. .......... 364/424.1
5,411,451 A * 5/1995 Ando et al. ................. 477/144
5,885,188 A * 3/1999 Iizuka ........................ 477/121
6,128,565 A * 10/2000 Tsutsui et al. ................ 701/51
6,149,547 A * 11/2000 Oba et al. .................... 477/154
6,259,983 B1 * 7/2001 Tsutsui et al. ................ 701/51

FOREIGN PATENT DOCUMENTS

JP    A-11-82704    3/1999
JP    B2-3-16545    3/1999

OTHER PUBLICATIONS

U.S. patent application Ser. No. 09/731,767, Kon et al., filed Dec. 8, 2000.

* cited by examiner

*Primary Examiner*—Tan Q. Nguyen
*Assistant Examiner*—Dalena Tran
(74) *Attorney, Agent, or Firm*—Lahive & Cockfield, LLP

(57) ABSTRACT

A shift control apparatus comprises clutches driven by shift solenoids and whether or not the raising of the rotation speed occurs in an internal combustion engine is determined. If the raising of the engine rotation speed is detected, a hydraulic pressure learn correction is made to engagement hydraulic pressure and a time learn correction is made to the hydraulic pressure supply preparation time. The correction ratio of the energization-hydraulic pressure characteristic (I-P characteristic) of clutch clearance and the shift solenoid is set so as to become an appropriate distribution ratio and the learning is started based thereon.

2 Claims, 34 Drawing Sheets

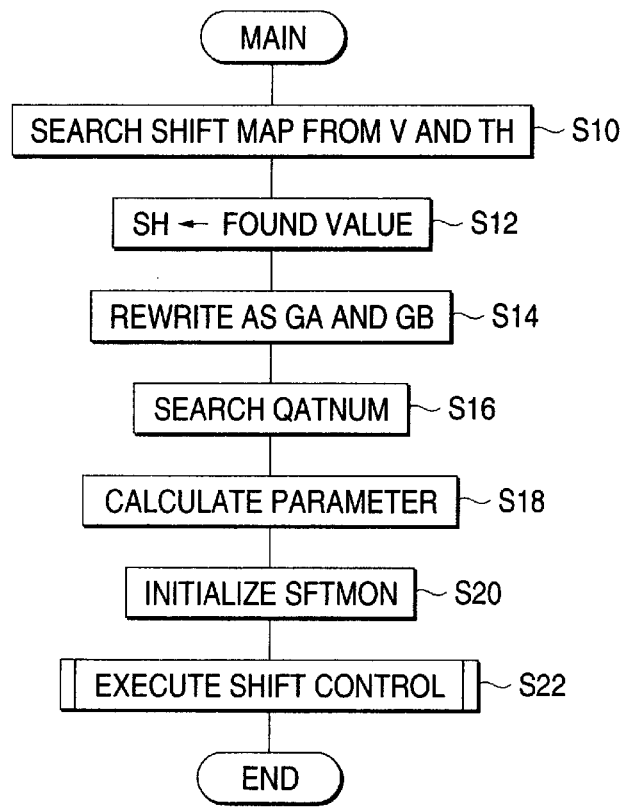
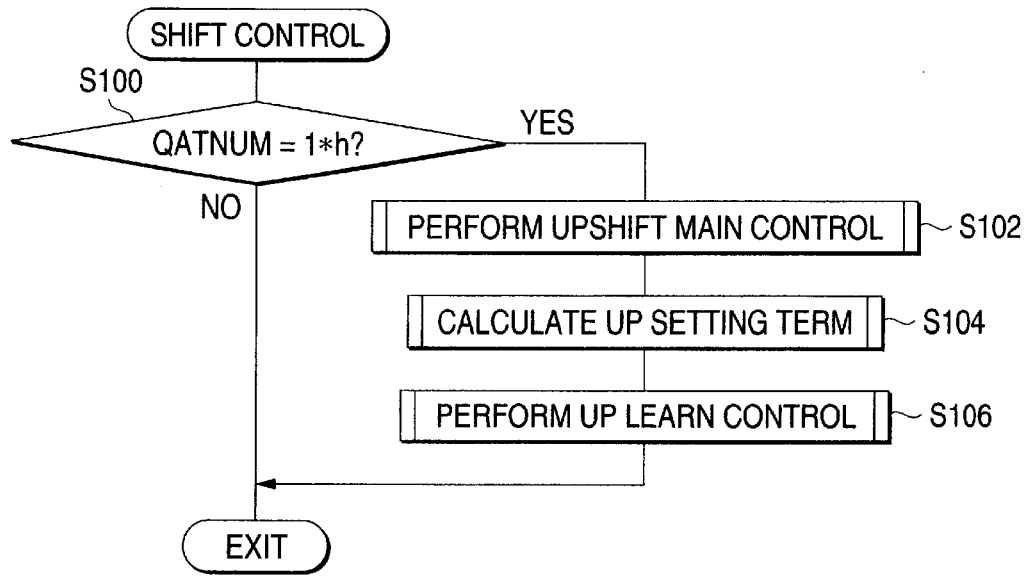

FIG. 11

| CORRECTION ITEM | PREPARATION TIME | I-P CHARACTERISTIC | OFF SPEED |
|---|---|---|---|
| CORRECTION METHOD | STORE AT ΔT WITH 85°C AS REFERENCE TEMPERATURE DIRECTION IS EXTENDED AS MUCH AS TIME RATIO | CORRECT WITH Δ TERM (TEMPERATURE DIRECTION IS COMMON) | CORRECT WITH Δ TERM (TEMPERATURE DIRECTION IS COMMON) |
| SUBSTANCE QUALITY IS UNEVEN | −0.1 ~ +0.6mm | −0.3 ~ +0.3kgf/cm² | — |
| CORRECTION WIDTH − SIDE | 00H: EQUIVALENT OF 0mm : 0ms | 40H: −0.2kgf/cm² | 80H: 0kgf/cm²/10ms |
| CORRECTION WIDTH + SIDE | 96H: EQUIVALENT OF 0.6mm = 150ms | E0H: +0.3kgf/cm² | C0H: +0.2Kgf/cm²/10ms |
| LABEL | TMUPASC | dQUAASC | dQUTRSC |
| NUMBER OF DATA PIECES | TH DIVISION FOUR + HIGH TEMPERATURE ONE FOR EACH CLUTCH | TH DIVISION FOUR + HIGH TEMPERATURE ONE FOR EACH CLUTCH | TH DIVISION FOUR + HIGH TEMPERATURE ONE FOR EACH CLUTCH |
| INITIAL VALUE | 00H: 0ms | A0H: +0.1kgf/cm² | 80H: +0.0kgf/cm²/10ms |
| CORRECTION STEP | 0.5H: 5ms | 0.4H: 0.0125kgf/cm² | 0.4H: 0.0125kgf/cm²/10ms |
| LSB | 1LSB = 1ms | 1LSB = 0.05/16kgf/cm² | 1LSB = 0.05/16kgf/cm² |
| IMAGE | TMDB1A + TMUPASC / TMDB1A | dQUAASC | dQUTRSC |
| | | | TO COPE WITH RECIPROCAL EVENT |

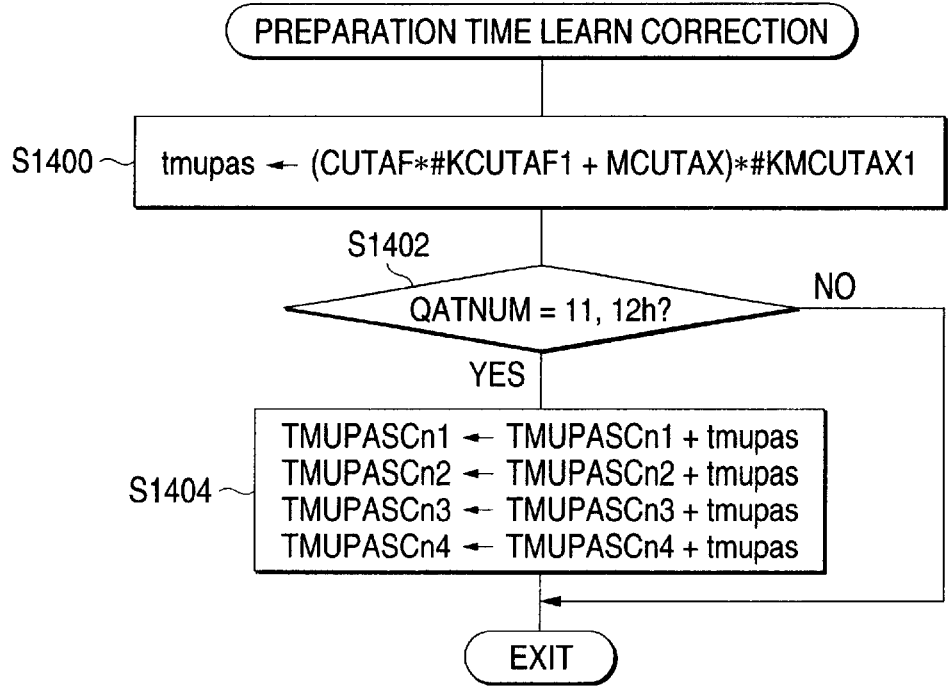
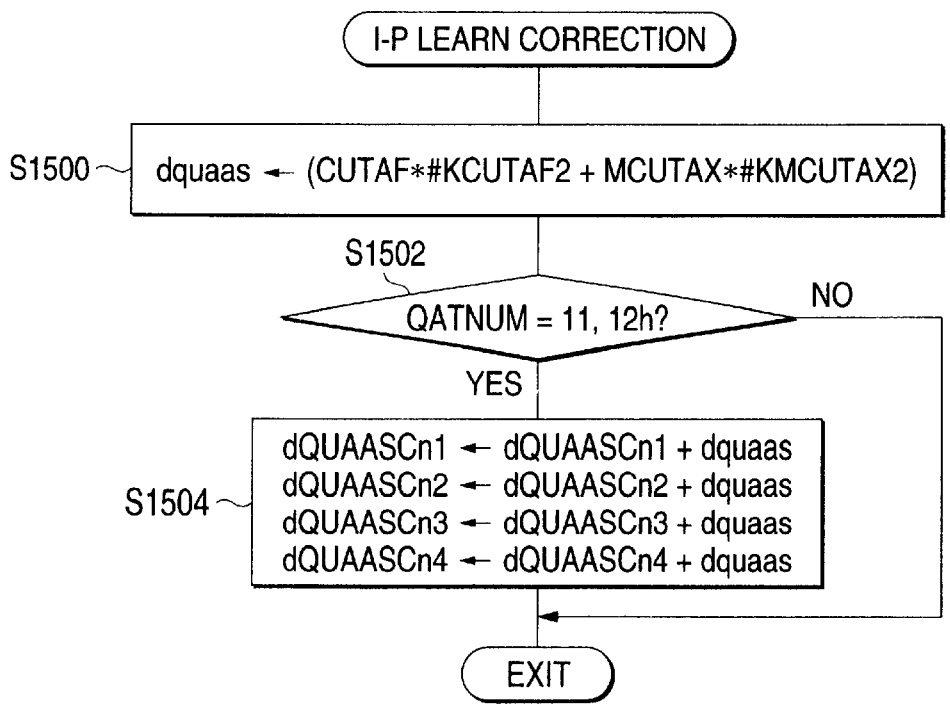

SHIFT CONTROL APPARATUS OF AUTOMATIC TRANSMISSION FOR VEHICLE

RELATED APPLICATIONS

This application claims priority to Japanese Patent Application No. P2000-211117 filed on Jul. 12, 2000 in Japan. The contents of the aforementioned application are hereby incorporated by reference.

BACKGROUND OF THE INVENTION

1. Field of the Invention

This invention relates to a shift control apparatus of an automatic transmission for a vehicle.

2. Description of the Related Art

For a shift control apparatus of an automatic transmission for a vehicle, hitherto, various arts have been proposed; for example, in an art described in JP-B-3-16545, a temporary rise in the engine speed during shifting is captured and the preparation time for a clutch on the engagement side (frictional engagement element) and engagement hydraulic pressure are corrected. In an art described in JP-A-11-82704, low-pressure standby time (preparation time) is corrected as the invalid stroke feeding time of a clutch is changed, whereby the servo start control time is controlled constant.

By the way, in an automatic transmission, generally a hydraulic clutch (frictional engagement element) is used and the clutch clearance differs depending on not only manufacturing variations, but also secular change. This also applies to the I-P characteristic (energization-hydraulic pressure) of an electromagnetic solenoid for driving a clutch.

For example, shortage of the preparation time or engagement hydraulic pressure is possible as a factor of raising the engine rotation speed. It is difficult to determine whether it is actually caused by a shift of the clutch clearance or the I-P characteristic of the electromagnetic solenoid from the setup value or caused by an error of hydraulic pressure control. Determining the cause requires a large number of data pieces during shifting and is substantially impossible.

SUMMARY OF THE INVENTION

It is therefore an object of the invention to provide a shift control apparatus of an automatic transmission for a vehicle for effectively canceling raising of the engine rotation speed regardless of the cause of the raising the engine rotation speed by making a learn correction to hydraulic pressure control and making the learn correction based on a predetermined correction ratio.

To the end, according to a first aspect of the invention, there is provided a shift control apparatus of an automatic transmission for a vehicle, comprising a plurality of frictional engagement elements driven by electromagnetic solenoids wherein hydraulic pressure is applied to the frictional engagement element on the engagement side and hydraulic pressure is discharged from the frictional engagement element on the release side for shifting output of an internal combustion engine, the shift control apparatus comprising hydraulic pressure control means for, at predetermined shifting time, outputting preparation hydraulic pressure based on preparation hydraulic pressure previously stored in the frictional engagement element on the engagement side and previously stored preparation time and next outputting engagement hydraulic pressure based on previously stored engagement hydraulic pressure characteristic relative to the target hydraulic pressure, raising occurrence detection means for determining whether or not raising the rotation speed occurs in the internal combustion engine by the time an inertia phase starts, and learn correction means for making a hydraulic pressure learn correction to the preparation hydraulic pressure and the engagement hydraulic pressure and a time learn correction to the preparation time at the next predetermined shifting time when the raising occurrence detection means detects raising the rotation speed of the internal combustion engine, wherein the learn correction means makes the hydraulic pressure learn correction and the time learn correction based on a predetermined correction ratio.

The learn correction means is provided for making a hydraulic pressure learn correction to the preparation hydraulic pressure and the engagement hydraulic pressure and more particularly a hydraulic pressure learn correction to the hydraulic pressure height and a time learn correction to the preparation time and more particularly a time learn correction to the duration of the preparation time at the next predetermined shifting time when raising of the rotation speed of the internal combustion engine is detected, and the learn correction means makes the hydraulic pressure learn correction and the time learn correction based on the predetermined correction ratio, so that the learn progress state can be reliably converged toward the target level and therefore raising of the rotation speed of the internal combustion engine can be canceled effectively.

In a second aspect of the invention, the predetermined correction ratio is a predetermined correction ratio relative to the energization-hydraulic pressure characteristic of the electromagnetic solenoid and clearance of the frictional engagement element.

Since the predetermined correction ratio is a predetermined correction ratio relative to the energization-hydraulic pressure characteristic of the electromagnetic solenoid and clearance of the frictional engagement element, the initial manufacturing variations and secular change in clearance of the frictional engagement element (clutch) can be corrected based on the duration of the preparation time and shift of a control signal and the actual supplied hydraulic pressure can be corrected based on the height of the hydraulic pressure; the learn progress state can be reliably converged toward the target level and therefore raising of the rotation speed of the internal combustion engine can be canceled effectively.

BRIEF DESCRIPTION OF THE DRAWINGS

FIG. 2 is a main flowchart showing the operation of the apparatus in FIG. 1;

FIG. 3 is a subroutine flowchart showing shift control processing in the flowchart of FIG. 2;

FIG. 11 is a schematic representation showing learn items containing the preparation time, learned in the learn regions in FIG. 10;

FIG. 27 is a subroutine flowchart showing preparation time learn correction processing in initial learn in the flowchart of FIG. 26;

FIG. 28 is a subroutine flowchart showing I-P learn correction processing in initial learn in the flowchart of FIG. 26;

DETAILED DESCRIPTION OF THE PREFERRED EMBODIMENTS

A shift control apparatus of an automatic transmission for a vehicle according to one embodiment of the invention will be discussed with reference to the accompanying drawings.

Figure 1:
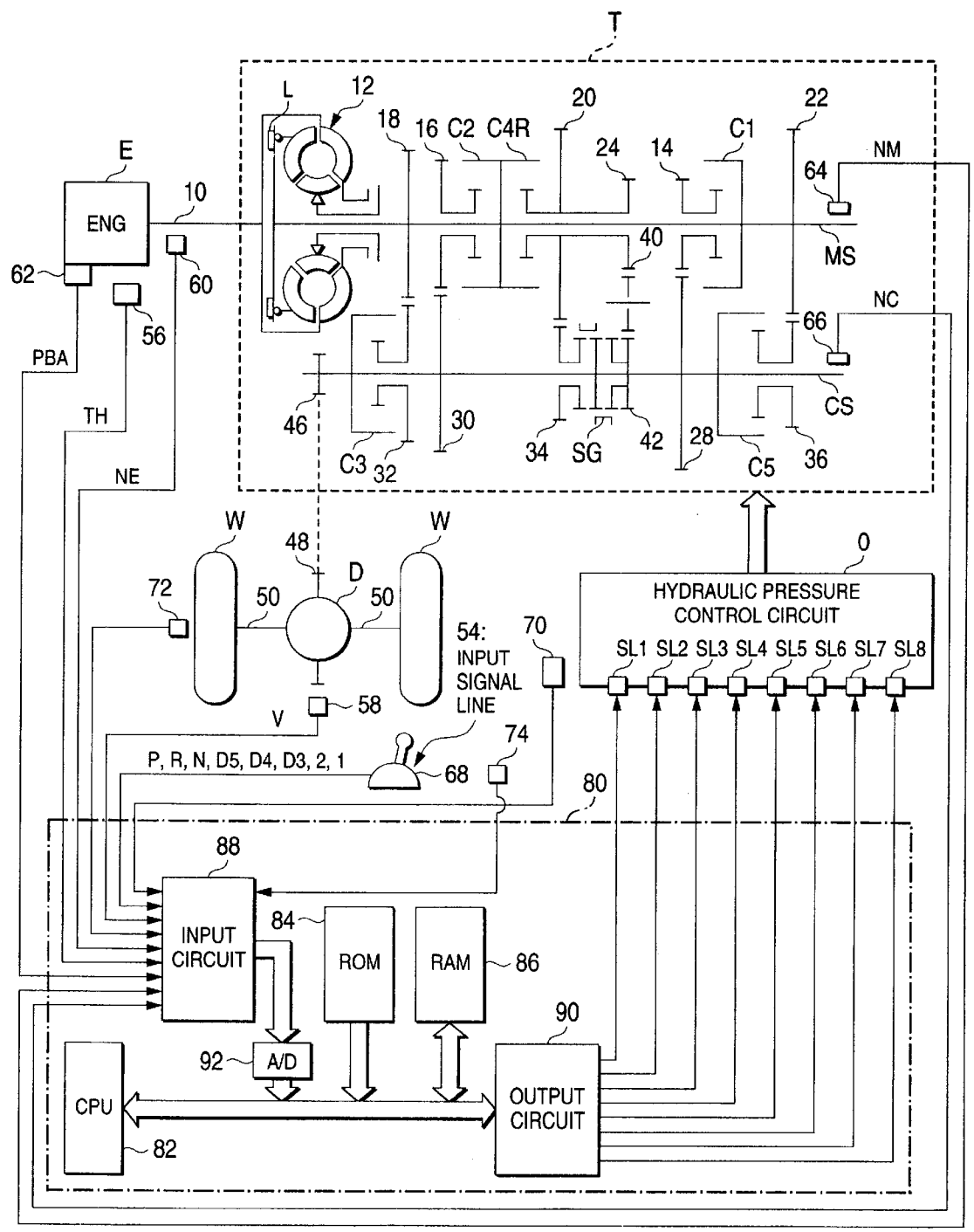
FIG. 1 is a schematic representation showing a shift control apparatus of an automatic transmission for a vehicle according to one embodiment of the invention as a whole.

FIG. 1 is a schematic drawing showing the control apparatus as a whole.

The control apparatus will be discussed. Letter T denotes an automatic transmission (hereinafter, simply referred to as "transmission"). The transmission T is implemented as a parallel axes type stepped automatic transmission of five forward gears and one reverse gear, installed in a vehicle (not shown).

The transmission T comprises a main shaft (input shaft) MS connected to a crankshaft 10 of an internal combustion engine (hereinafter, simply referred to as "engine") E through a torque converter 12 having a lockup mechanism L and a counter shaft (output shaft) CS connected to the main shaft MS through a plurality of gear trains.

Supported on the main shaft MS are a main first gear 14, a main second gear 16, a main third gear 18, a main fourth gear 20, a main fifth gear 22, and a main reverse gear 24.

Supported on the counter shaft CS are a counter first gear 28 meshing with the main first gear 14, a counter second gear 30 meshing with the main second gear 16, a counter third gear 32 meshing with the main third gear 18, a counter fourth gear 34 meshing with the main fourth gear 20, a counter fifth gear 36 meshing with the main fifth gear 22, and a counter reverse gear 42 connected to the main reverse gear 24 through a reverse idle gear 40.

If the main first gear 14 supported on the main shaft MS for relative rotation is joined to the main shaft MS by a first speed hydraulic clutch C1, the first speed (gear, shift step) is established.

If the main second gear 16 supported on the main shaft MS for relative rotation is joined to the main shaft MS by a second speed hydraulic clutch C2, the second speed (gear, shift step) is established. If the counter third gear 32 supported on the counter shaft CS for relative rotation is joined to the counter shaft CS by a third speed hydraulic clutch C3, the third speed (gear, shift step) is established.

If the main fourth gear 20 supported on the main shaft MS for relative rotation is joined to the main shaft MS by a fourth speed reverse hydraulic clutch C4R in a state in which the counter fourth gear 34 supported on the counter shaft CS for relative rotation is joined to the counter shaft CS by a selector gear SG, the fourth speed (gear, shift step) is established.

If the counter fifth gear 36 supported on the counter shaft CS for relative rotation is joined to the counter shaft CS by a fifth speed hydraulic clutch C5, the fifth speed (gear, shift step) is established.

Further, if the main reverse gear 24 supported on the main shaft MS for relative rotation is joined to the main shaft MS by the fourth speed reverse hydraulic clutch C4R in a state in which the counter reverse gear 42 supported on the counter shaft CS for relative rotation is joined to the counter shaft CS by the selector gear SG, the reverse shift step is established.

Rotation of the counter shaft CS is transmitted via a final drive gear 46 and a final driven gear 48 to a differential D and then is transmitted via left and right drive shafts 50 and 50 to drive wheels W and W of the vehicle (not shown) in which the internal combustion engine E and the transmission T are installed.

A shift lever 54 is placed in the vicinity of the floor of a driver's seat (not shown) of the vehicle for the driver to select any of the eight ranges of P, R, N, D5, D4, D3, 2, and 1.

A throttle opening sensor 56 is placed in the vicinity of a throttle valve (not shown) placed in an air intake passage of the engine E and outputs a signal indicating throttle opening TH. A vehicle speed sensor 58 is placed in the vicinity of the final driven gear 48 and outputs a signal indicating vehicle speed V each time the final driven gear 48 makes one revolution.

Further, a crank angle sensor 60 is placed in the vicinity of a camshaft (not shown) and outputs a CYL signal at a predetermined crank angle of a specific cylinder, a TDC signal at a predetermined crank angle of each cylinder, and a CRK signal every crank angle into which the predetermined crank angle is subdivided (for example, 15 degrees). An absolute pressure sensor 62 is placed down stream from the throttle valve placement position in the air intake passage of the engine E and outputs a signal indicating absolute pressure in an intake pipe (engine load) PBA.

A first number-of-revolutions sensor 64 is placed in the vicinity of the main shaft MS and outputs a signal each time the main shaft MS makes one revolution. A second number-of-revolutions sensor 66 is placed in the vicinity of the counter shaft CS and outputs a signal each time the counter shaft CS makes one revolution.

Further, a shift lever position sensor 68 is placed in the vicinity of the shift lever 54 placed in the vicinity of the vehicle driver's seat and outputs a signal indicating the position selected by the driver from among the eight positions (ranges) mentioned above.

Further, a temperature sensor 70 is placed at an appropriate position of the transmission T or in the vicinity thereof and outputs a signal proportional to oil temperature (automatic transmission fluid temperature, working oil temperature) TATF. A brake switch 72 is placed in the vicinity of a brake pedal (not shown) placed on the vehicle driver's seat floor and outputs an ON signal when the driver presses the brake pedal.

An accelerator opening sensor 74 is placed in the vicinity of an accelerator pedal (not shown) placed on the vehicle driver's seat floor and outputs a signal proportional to accelerator opening (accelerator pedal position) AP operated by the driver.

Outputs of the sensor 56, etc., are sent to an ECU (electronic control unit) 80.

The ECU 80 is implemented as a microcomputer having a CPU 82, ROM 84, RAM 86, an input circuit 88, and an output circuit 90. The microcomputer comprises an A/D converter 92.

Outputs of the sensor 56, etc., described above are input to the microcomputer through the input circuit 88; analog output is converted into a digital value by the A/D converter 92 and digital output is processed by a processing circuit of a waveform shaping circuit, etc., (not shown) and is stored in the RAM 86.

The output of the vehicle speed sensor 58 and the CRK signal output of the crank angle sensor 60 are counted by counter (not shown) and the vehicle speed V and the engine speed NE are detected. The outputs of the first number-of-revolutions sensor 64 and the second number-of-revolutions sensor 66 are also counted and the number of input shaft revolutions NM and the number of output shaft revolutions NC of the transmission are detected.

In the microcomputer, the CPU 82 determines the destination step or the target step (transmission gear ratio), energizes or does not energize shift solenoids (electromagnetic solenoids) SL1 to SL5 disposed on a hydraulic pressure control circuit via the output circuit and a voltage supplying circuit (not shown) for performing switch control of each clutch, and energizes or does not energize linear solenoids SL6 to SL8 for controlling the operation of the lockup mechanism L of the torque converter 12 and the hydraulic pressure of each clutch.

Next, a description will be given of the operation of the shift control apparatus of the automatic transmission for a vehicle according to the embodiment of the invention.

FIG. 2 is a flowchart showing the operation. A program shown in the figure is executed every 10 msec, for example.

At S10, a known shift map (shift scheduling map (not shown)) is searched from the detected vehicle speed V and throttle opening TH. The program proceeds to S12 and the found value is rewritten as destination step (shift step) SH. The program proceeds to S14 and the current step (shift step) in engagement at present is detected and is rewritten as GA and the target step SH is rewritten as preceding step GB.

Next, the program proceeds to S16 and shift mode QATNUM is searched. The shift mode QATNUM is specifically described as 11h (first-to-second gear upshift), 12h (second-to-third gear upshift), 21h (second-to-first gear downshift), 31h (first speed hold), etc. That is, if the first digit is 1, it indicates upshift, if the first digit is 2, it indicates downshift, and if the first digit is 3, it indicates hold. In the description that follows, the shift mode QATNUM may be described as QATNUM=1*h, etc., in which case it means that whether or not the shift mode is upshift is determined regardless of the digit of *.

Next, the program proceeds to S18 and a parameter is calculated.

Difference rotation (clutch difference rotation) NMNCI between the number of main shaft revolutions NM and the number of counter shaft revolutions NC is calculated as the parameter. To calculate the difference rotation NMNCI, the difference between the number of main shaft revolutions NM and the number of counter shaft revolutions NC is multiplied by #RATIOn (preceding step reduction gear ratio) and the absolute value of the result is adopted.

Next, the program proceeds to S20 and when it is determined that shift is required in processing of S10 and later, value SFTMON in the RAM indicating the control timing is initialized to 0 and the program proceeds to S22 and shift control (linear solenoid control) is executed. As seen from the description made above, if the shift mode QATNUM is 3, the current step (gear) is held and shift control is not executed.

In the description that follows, the first-to-second gear upshift or the second-to-third gear upshift is taken as an example. That is, the current step GA is the first speed (gear) and the destination step GB is the second speed (gear).

FIG. 3 is a flowchart showing the shift control and more particularly, linear solenoid control as a whole.

Whether or not QATNUM=1*h, namely, the shift mode is upshift is determined at S100. If the shift mode is upshift, the program proceeds to S102 and upshift main control is performed.

Figure 4:
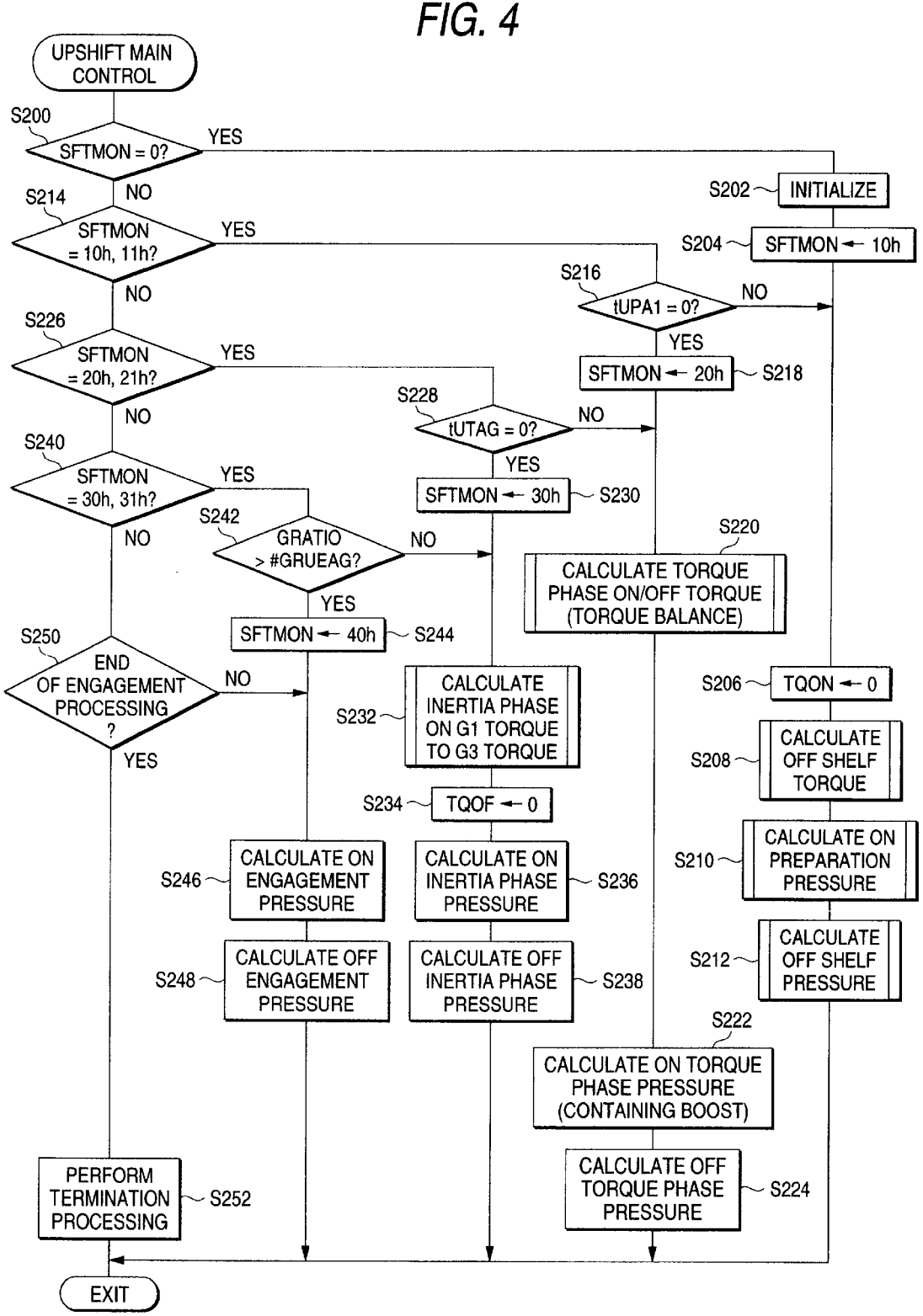
FIG. 4 is a subroutine flowchart showing upshift (UP) control processing in the flowchart of FIG. 3.
Figure 5:
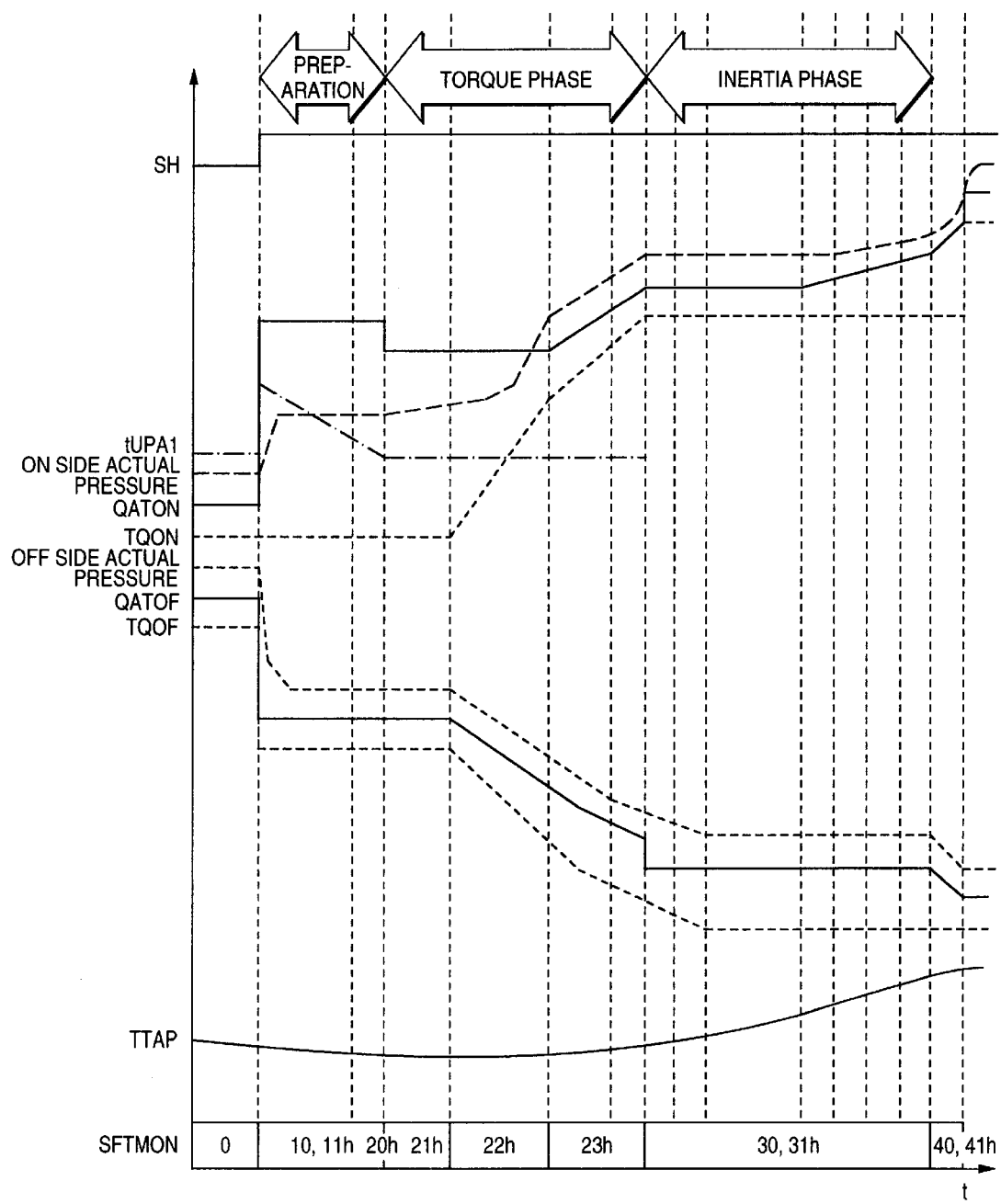
FIG. 5 is a time chart showing the control timing in the flowchart of FIG. 4.

FIG. 4 is a subroutine flowchart showing the upshift main control and FIG. 5 is a time chart showing the upshift main control timing. The upshift main control shown in FIG. 4 was previously described in detail in Japanese Patent Application No. Hei 11-350890, etc., by the applicant and therefore will be discussed only briefly.

Referring also to the time chart of FIG. 5, whether or not the value of SFTMON is 0 is determined at S200. Since the value is initialized to 0 at S20 in the flowchart of FIG. 2, the determination at S200 is Yes and the program proceeds to S202 at which the values of target clutch torque, etc., described later are all initialized to 0 and the program proceeds to S204 and SFTMON is set to 10h.

Next, the program proceeds to S206 and since the current point in time is the shift preparation start time in the time chart of FIG. 5, the target clutch torque of the clutch C2 for realizing the second speed gear of the destination step, which will be hereinafter referred to as TQON, is set to 0 and the program proceeds to S208 at which the target clutch torque of the clutch C1 for realizing the first speed gear of the current step, which will be hereinafter referred to as TQOF, is set to a predetermined OFF shelf torque and more particularly to a torque amount required for holding engine torque. In the embodiment, the value of a flat part in the target clutch torque on the release (OFF) side and the hydraulic pressure thereon is referred to as shelf.

Figure 6:
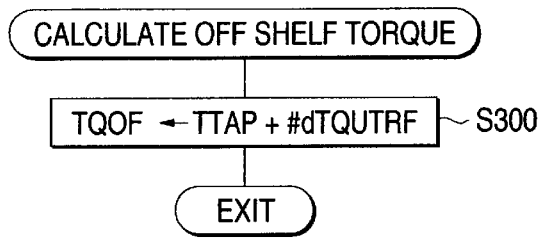
FIG. 6 is a subroutine flowchart showing OFF shelf torque calculation processing in the flowchart of FIG. 4.

FIG. 6 is a subroutine flowchart showing OFF shelf torque calculation processing.

At S300, the value resulting from adding allowance addition torque value #dTQUTRF to engine torque TTAP is adopted as shelf torque (OFF side target clutch torque TQOF).

Referring again to the flowchart of FIG. 4, the program proceeds to S210 and the ON preparation pressure of the clutch C2 for realizing the destination step of the engagement (ON) side, that is, clutch hydraulic pressure amount (QATON) is calculated and set. This is a work corresponding to so-called an invalid stroke feeding. The invalid stroke feeding feeds the oil chamber with the fluid by an amount which is sufficient for moving the piston from a rest position to a critical position which is ready for effecting the actual pressure against the drive and driven clutch plates.

Figure 7:
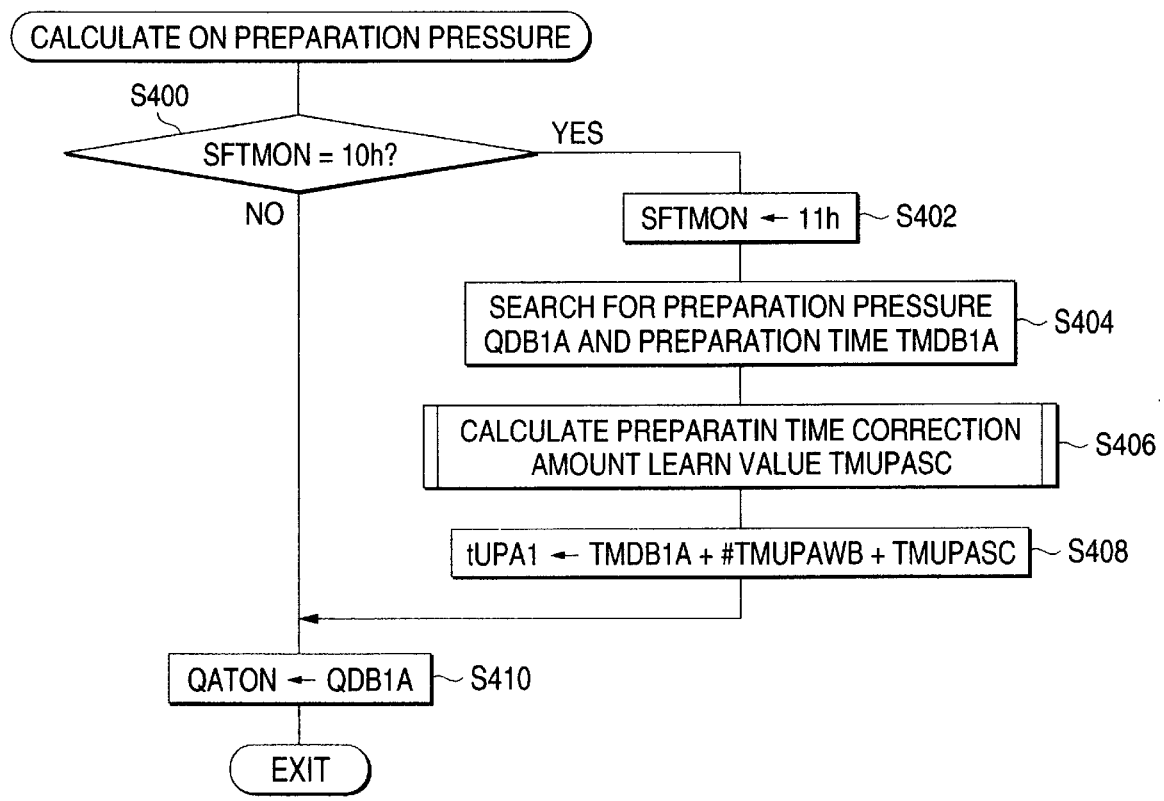
FIG. 7 is a subroutine flowchart showing ON preparation pressure calculation processing in the flowchart of FIG. 4.

FIG. 7 is a subroutine flowchart showing the work.

In the calculation of the preparation pressure (pressure corresponding to the invalid stroke feeding), the supplied hydraulic pressure and the filling time optimum for the invalid stroke feeding of the clutch (in the example, the second speed clutch C2) are determined by the number of revolutions of the clutch and the ATF oil temperature. Since the filling time changes with the factors of the manipulation amount (supplied hydraulic pressure), the number of revolutions of clutch, the oil temperature, etc., the clutch position etc., of the fluctuation factors is previously calculated and stored, and the mechanical variations etc., of the clutch are compensated for in the whole shift control system.

In FIG. 7, first whether or not STFMON is 10h is determined at S400. Since STFEMON is set to 10h at S204 in the flowchart of FIG. 4, the determination at S400 is Yes and the program proceeds to S402 at which the value of STFMON is rewritten as 11h. Then, the program proceeds to S404 and search is made for preparation pressure QDB1A and preparation time TMDB1A of the ON side clutch (in the example, the second speed clutch C2).

Specifically, the map is searched for the preparation pressure QDB1A from the detected number of input shaft revolutions NM and the ATF oil temperature TATF and the map is searched for the preparation time (time required for completing invalid stroke feeding) TMDB1A from the detected number of input shaft revolutions NM and the ATF oil temperature TATF.

Next, the program proceeds to S406 and preparation time correction amount learn value TMUPASC provided by learning described later is calculated.

Figure 8:
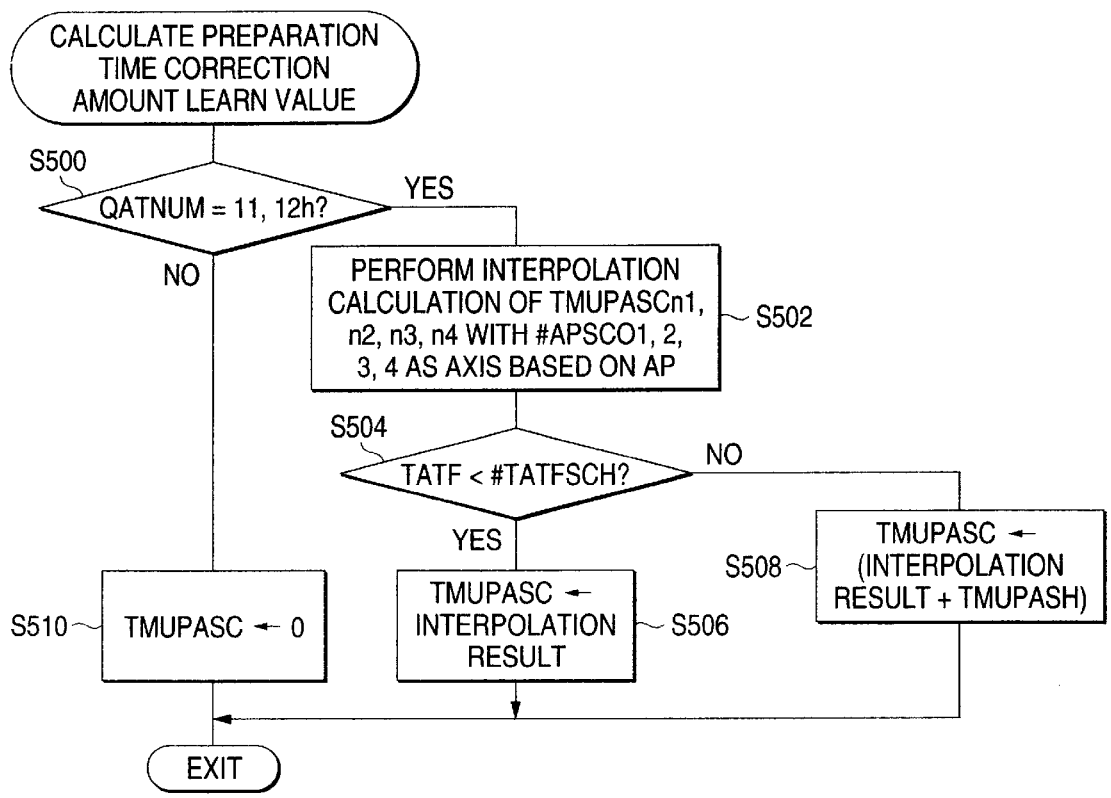
FIG. 8 is a subroutine flowchart showing learn preparation time calculation processing in the flowchart of FIG. 7.

FIG. 8 is a subroutine flowchart showing the work.

Figure 9:
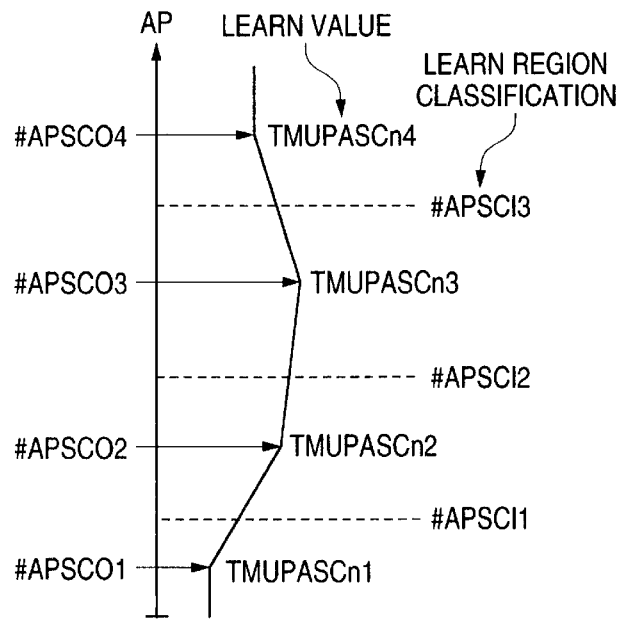
FIG. 9 is a graph to describe processing in the flowchart of FIG. 8.

First, at S500, whether or not QATNUM=11h or 12h, namely, the shift mode is the first-to-second or second-to-third gear upshift is determined. If the determination at step S500 is Yes, the program proceeds to S502 at which a table shown in FIG. 9 is searched based on the detected accelerator opening (accelerator pedal position) AP and the learn preparation time TMUPASC is calculated with basic value #APSCO1, 2, 3, 4 as an axis and more particularly interpolation calculation of TMUPASCn1, n2, n3, n4 is performed and the learn preparation time TMUPASC is calculated.

That is, only four preparation time correction amount learn values provided by learning described later are stored in the table in response to the accelerator opening and the adjacent stored values are interpolated based on the detected accelerator opening and the learn preparation time is calculated.

Next, the program proceeds to S504 and whether or not the detected oil temperature TATF is less than a predetermined value #TATFSCH is determined. If the determination at S504 is Yes, the program proceeds to S506 and the interpolation result is adopted as the learn preparation time TMUPASC; if the determination at S504 is No, the program proceeds to S508 and a predetermined value TMUPASH is added to the interpolation result and the addition result is adopted as the learn preparation time TMUPASC. The reason why the correction amount when the oil temperature is high is made separate is that the engine rotation speed is easily raised due to the lowering of the supplied hydraulic pressure at high temperature and that the reliability of hydraulic pressure control is degraded for the same factor. Therefore, if a learn value is determined to cope with raising the engine rotation speed at high oil temperature time, it becomes too large as the correction amount in the normal shift control state at non-high oil temperature time and the correction amount at high oil temperature time is determined separately. If the determination at S500 is No, the program proceeds to S510 and the learn preparation time TMUPASC is set to 0.

Figure 10:
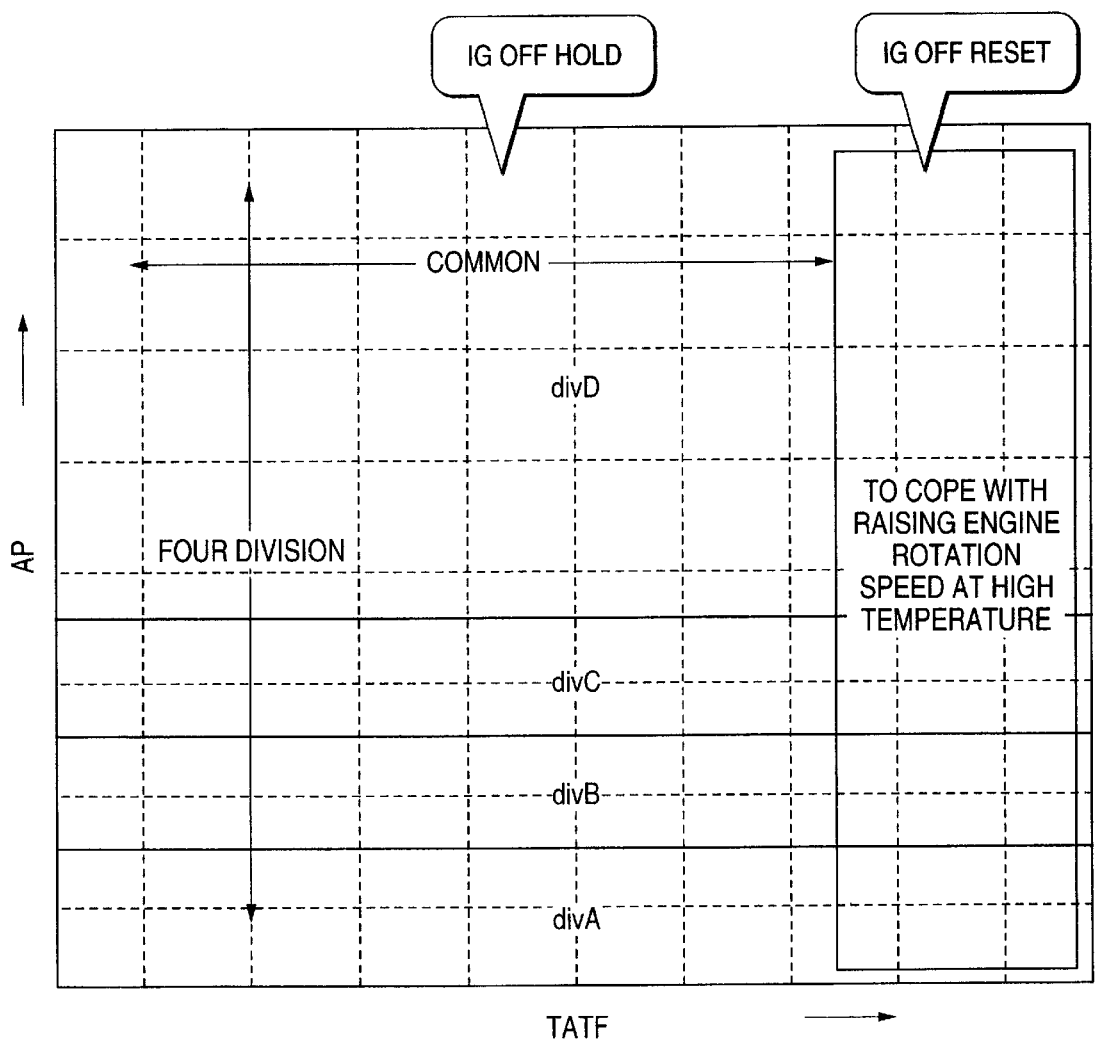
FIG. 10 is a graph showing learn regions of learn preparation time calculation processing in the flowchart of FIG. 7.

Thus, in the embodiment, the learn range is divided into four regions of divA to divD in response to the accelerator opening AP and a separate correction amount is provided for coping with raising the engine rotation speed at high temperature, as shown in FIG. 10. In addition to the preparation time, the I-P characteristic (output hydraulic pressure characteristic of clutch Cn relative to energization of shift solenoid SLn) and off speed (of OFF (release) side clutch) are adopted as learn correction items as shown in FIG. 11, and similarity is also applied thereto (in FIG. 11, some parameters are shown in hexadecimal notation).

Returning to the description of the flowchart of FIG. 7, the program proceeds to S408 at which a predetermined value #TMUPAWB (extreme low temperature correction amount for timer set time determination) and the preparation time correction amount learn value TMUPASC are added to the found preparation time TMDB1A and the sum is set in a timer tUPA1 (down counter) and time measurement is started. Next, the program proceeds to S410 and the provided preparation pressure QDB1A is adopted as the clutch hydraulic pressure amount QATON. If the determination at S400 is No, the program also proceeds to S410 and the similar operation is performed.

According to the configuration, the variation width is small in response to startup of clutch and responsivity is also appropriate. Further, since a correction is made with the learn value at the next upshift time, the manipulation amount and the preparation time can be calculated in quick response to manufacturing variations and secular change in clutch clearance.

Returning to the description of the flowchart of FIG. 4, the program proceeds to S212 and OFF shelf pressure is calculated.

Figure 12:
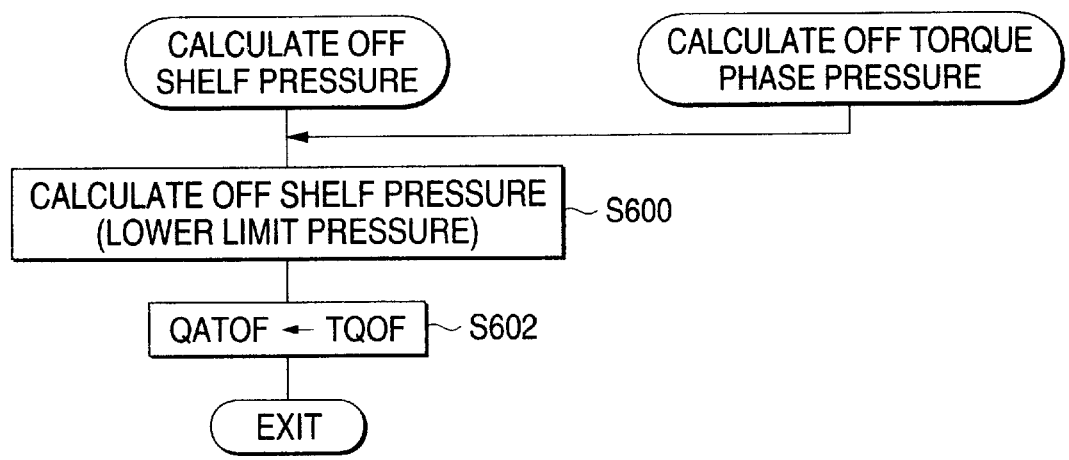
FIG. 12 is a subroutine flowchart showing OFF shelf pressure calculation processing in the flowchart of FIG. 4.

FIG. 12 is a subroutine flowchart showing OFF shelf pressure calculation processing.

In FIG. 12, OFF shelf pressure (lower limit pressure) TQOF is calculated appropriately at S600 and the program proceeds to S602 and the calculated OFF shelf pressure TQOF is adopted as clutch hydraulic pressure amount QATOF.

Returning to the description of the flowchart of FIG. 4, the determination at S200 is No in the next program loop and the program proceeds to S214 and whether or not SFTMON is 10h or 11h (shown in FIG. 5) is determined.

If the determination at S214 is Yes, the program proceeds to S216 and whether or not the value of the timer tUPA1 reaches 0 is determined. If the determination at S216 is No, it is determined that the time has not yet elapsed, and the program proceeds to S206; if the determination at S216 is Yes, the program proceeds to S218 and SFTMON is rewritten as 20h.

Next, the program proceeds to S220 and torque phase ON/OFF torque is calculated.

Figure 13:
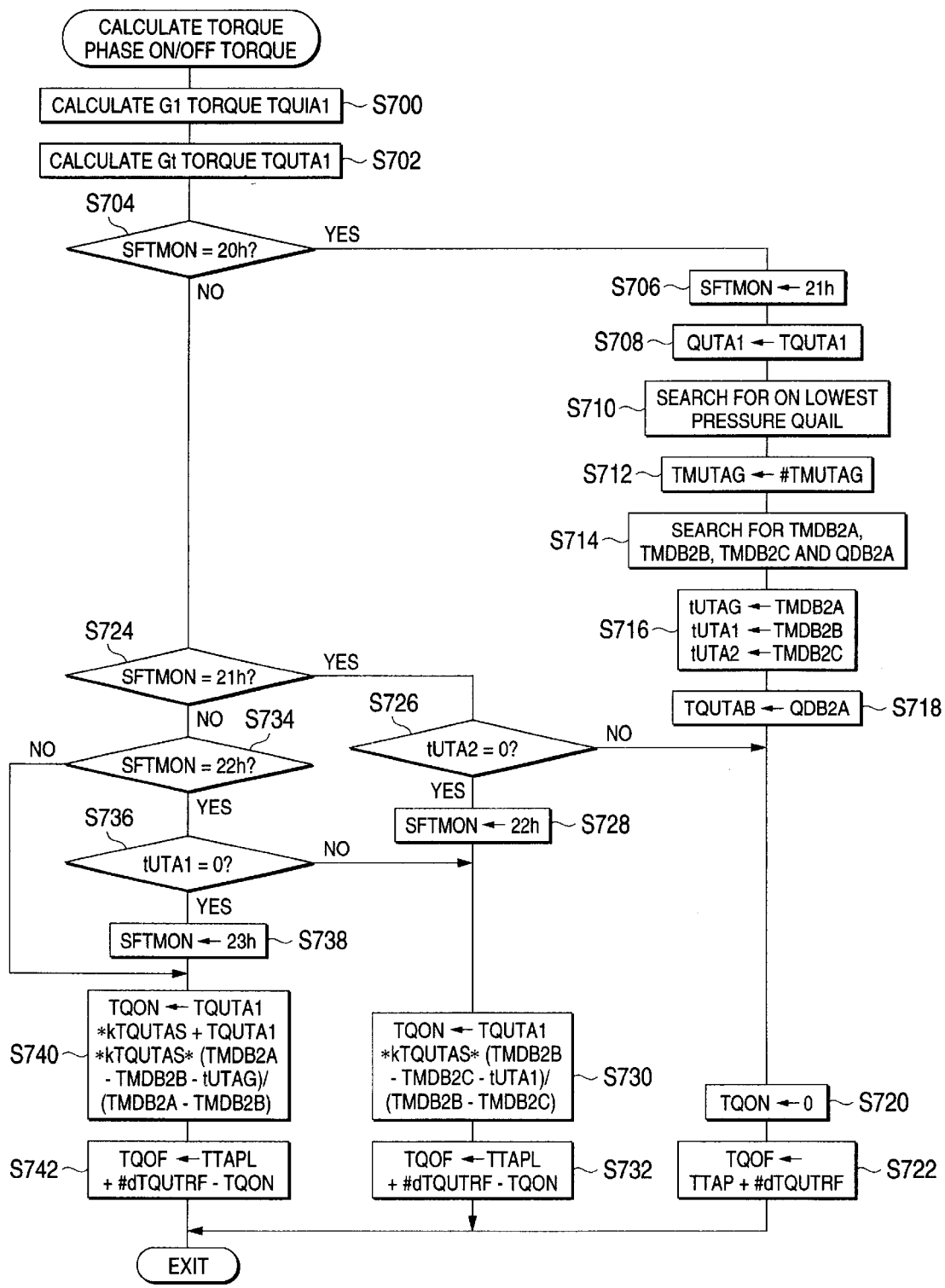
FIG. 13 is a subroutine flowchart showing torque phase ON/OFF torque calculation processing in the flowchart of FIG. 4.

FIG. 13 is a subroutine flowchart showing torque phase ON/OFF torque calculation processing.

The torque phase ON/OFF torque determines the supplied hydraulic pressure considering the follow-up property of the hydraulic pressure. More particularly, at the ON side clutch, for startup after the preparation termination, the startup characteristics of torque and follow-up time relative to the hydraulic pressure height are determined from data held in the ECU 80. That is, how the ON side clutch starts to have a torque at what point in time is understood, and the hydraulic pressure required for the OFF side clutch is calculated from the understood ON side clutch torque and engine torque is calculated. To sum up, the OFF side value is determined so as to balance the ON side input.

In FIG. 13, G1 torque TQUIA1 is calculated at S700. The G1 torque means the target torque at the inertia phase start time determined based on the target value of back-and-forth gravity acceleration (G).

Next, the program proceeds to S702 and Gt torque TQUTA1 is calculated. The Gt torque TQUTA1 is a torque at the torque phase termination time.

Next, the program proceeds to S704 and whether or not SFTMON is 20h, namely, whether or not the program loop is the first program loop after the entrance into the torque phase is determined. If the determination at S704 is Yes, the program proceeds to S706 and the value of SFTMON is set to 21h, then the program proceeds to S708 and the Gt torque TQUTA1 is adopted as Gt pressure QUTA1 in terms of hydraulic pressure.

Next, the program proceeds to S710 and a search is made for ON side lowest pressure QUIAL.

Next, the program proceeds to S712 and a search is made for a predetermined value #TMUTAG and the predetermined value #TMUTAG is adopted as torque phase target time TMUTAG. Then, the program proceeds to S714 and torque phase control time TMDB2A (follow-up time to target value), boost control time TMDB2B, torque phase break time TMDB2C, and torque phase boost pressure QDB2A of the ON side clutch of upshift are calculated.

Next, the program proceeds to S716 and the torque phase control time TMDB2A, the boost control time TMDB2B, and the break time TMDB2C are set in timers tUTAG, tUTA1, and tUTA2 respectively and time measurement is started. Then, the program proceeds to S718 and the boost pressure QDB2A calculated in accordance with an appropriate characteristic is converted into torque TQUTAB.

Next, the program proceeds to S720 and ON side clutch torque TQON is set to 0. Then, the program proceeds to S722 and allowance addition torque value #dTQUTRF is added to estimated input torque TTAP and the sum is adopted as OFF side clutch torque TQOF.

On the other hand, if the determination at S704 is No, the program proceeds to S724 and whether or not SFTMON is 21h is determined. If the determination at S724 is YES, the program proceeds to S726 and whether or not the value of the timer tUTA2 (TMDB2C) is 0 is determined. If the determination at S726 is No, it is determined that break does not occur, and the program proceeds to S720.

If the determination at S726 is Yes, the program proceeds to S728 and SFTMON is set to 22h and the program proceeds to S730 at which linear interpolation of TQUTA1, etc., is executed and the ON side clutch torque TQON is calculated. Then, the program proceeds to S732 and TQON is subtracted from the value found in a similar manner to that at S722 and the result value is adopted as the OFF side clutch torque TQOF.

If the determination at S724 is No, the program proceeds to S734 and whether or not SFTMON is 22h is determined. If the determination at S734 is Yes, the program proceeds to S736 and whether or not the timer tUTA1 is 0 is determined. If the determination at S736 is No, the program proceeds to S730; if the determination at S736 is Yes, the program proceeds to S738 and SFTMON is set to 23h. If the determination at S734 is No, the program proceeds to S740.

Then, the program proceeds to S740 and linear interpolation is performed as shown in the figure and the ON side clutch torque TQON is calculated. Then, the program proceeds to S742 and the OFF side clutch torque TQOF is calculated as at S732.

Returning to the description of the flowchart of FIG. 4, the program proceeds to S222 and the ON side torque phase pressure (clutch hydraulic pressure amount) QATON is calculated from the Gt pressure, etc. Then, the program proceeds to S224 and the OFF side clutch torque phase pressure (clutch hydraulic pressure amount) QATOF is calculated.

On the other hand, if the determination at S214 is No, the program proceeds to S226 and whether or not SFTMON is 20h or 21h is determined. If the determination at S226 is Yes, the program proceeds to S228 and whether or not the value of the timer tUTAG is 0 is determined. If the determination at S228 is No, the program proceeds to S220; if the determination at S228 is Yes, the program proceeds to S230 and the value of SFTMON is set to 30h. Next, the program proceeds to S232 and the G1 torque, G2 torque, and G3 torque of the ON side of the inertia phase are calculated.

Figure 14:
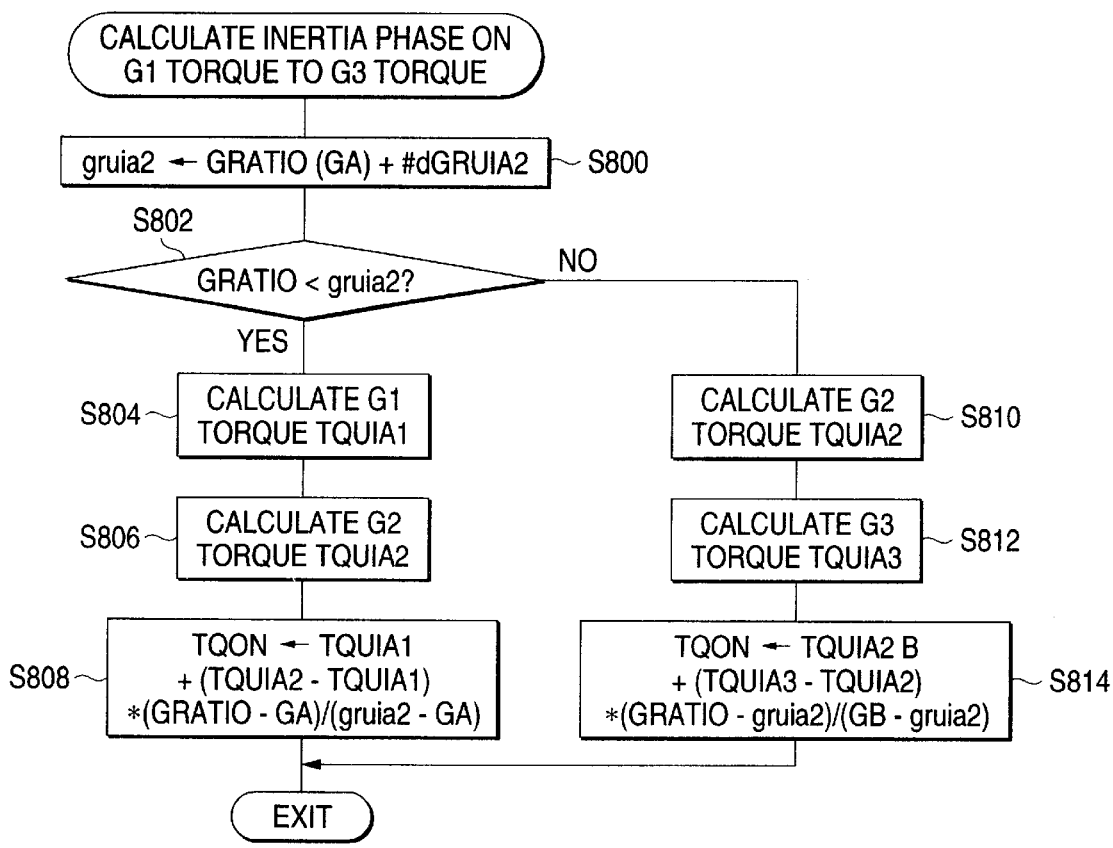
FIG. 14 is a subroutine flowchart showing calculation processing of G1 torque, etc., of the ON side of an inertia phase in the flowchart of FIG. 4.

FIG. 14 is a subroutine flowchart showing the calculation processing.

Figure 15:
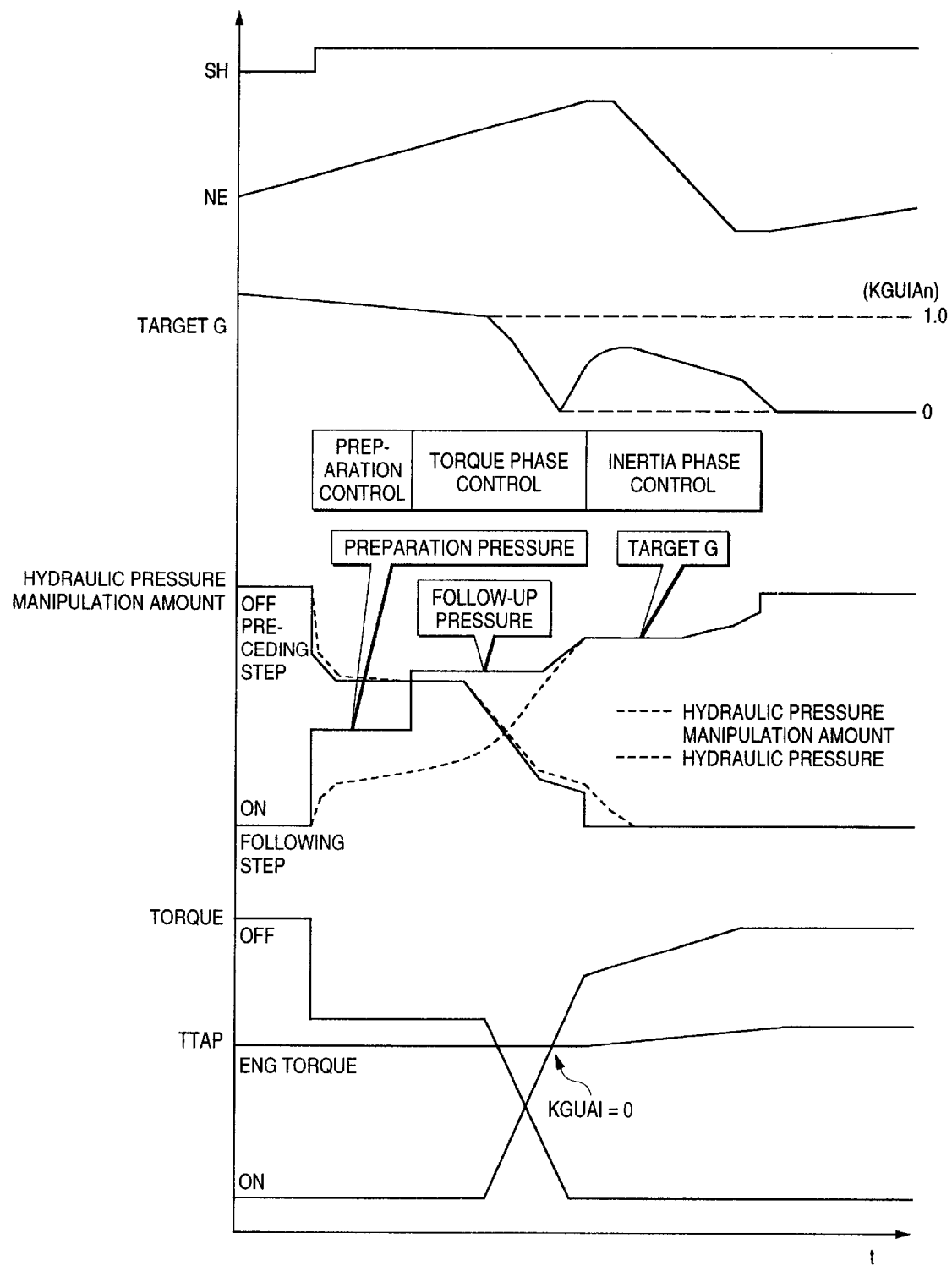
FIG. 15 is a time chart showing processing in the flowchart of FIG. 14.

Before a description of the subroutine in FIG. 14 is started, an outline of the calculation processing is given with reference to FIG. 15. In FIG. 15, target G denotes the target value of back-and-forth or gravity acceleration G acting on the whole vehicle. In the control, the target G is preset on the front side and the rear side of the inertia phase and when the target G is set, using ratio (predetermined value) KGUIAn (n: About 1 to 3) using gear ratios #RATIOn and m before and after shift and estimated input torque TTAP (TTAPL), the clutch torque (manipulation amount) is determined based on the value. In the figure, the value equivalent to the engine torque TTAP corresponds to height 0 equal to G on the rear side (KGUIA1=0).

Referring to the flowchart of FIG. 14, first at S800, a predetermined value #dGRUIA2 is added to clutch slip ratio GRATIO (GA) equivalent to the preceding step (current step) to calculate switch slip ratio gruia2 in the inertia phase. GRATIO (GA) is a value found by multiplying the clutch slip ratio GRATIO (number of input shaft revolutions NM/number of output shaft revolutions NC) by a reduction ratio and is a value corresponding to the preceding shift step (gear).

Next, the program proceeds to S802 and whether or not the clutch slip ratio GRATIO is less than the switch slip ratio gruia2 is determined. If the determination at S802 is Yes, it is determined that is on the front side of the inertia phase, and the program proceeds to S804 and G1 torque TQUIA1 is calculated.

Next, the program proceeds to S806 and G2 torque TQUIA2 is calculated. Next, the program proceeds to S808 and the calculated G1 torque TQUIA1 and G2 torque TQUIA2 are interpolated and the ON side clutch torque TQON therebetween is calculated. The G2 torque and G3 torque described just below mean similar torques at an inertia phase intermediate point and termination point.

If the determination at S802 is No, the program proceeds to S810 and G2 torque TQUIA2 is calculated. Then, the program proceeds to S812 and G3 torque TQUIA3 is calculated. Next, the program proceeds to S814 and the calculated G2 torque TQUIA2 and G3 torque TQUIA3 are interpolated and the ON side clutch torque TQON therebetween is calculated.

Returning to the description of the flowchart of FIG. 4, the program proceeds to S234 and the OFF side clutch torque TQOF in the inertia phase is set to 0. Then, the program proceeds to S236 and clutch hydraulic pressure QATON is calculated in accordance with appropriate torque hydraulic pressure conversion processing based on the calculated ON side inertia phase clutch torque TQON and a command is given to the corresponding shift solenoid SLn based on the calculated clutch hydraulic pressure QATON.

Next, the program proceeds to S238 and clutch hydraulic pressure QATOF is calculated in accordance with appropriate torque hydraulic pressure conversion processing based on the OFF side clutch torque TQOF in the inertia phase similarly set and a command is given to the corresponding shift solenoid SLn based on the calculated clutch hydraulic pressure QATOF.

The determination at S226 is No in the next or later program loop and the program proceeds to S240 and whether or not SFTMON is 30h or 31h is determined. If the determination at S240 is Yes, the program proceeds to S242 and whether or not the clutch slip ratio GRATIO exceeds a predetermined value #GRUEAG is determined.

The predetermined value #GRUEAG is an engagement control start clip ratio and therefore S242 means determining whether or not shifting is going to terminate as the clutch starts engagement control.

If the determination at S242 is No, the program proceeds to S232. If the determination at S242 is Yes, the program proceeds to S244 and SFTMON is set to 40h. Next, the program proceeds to S246 and ON side engagement pressure (clutch hydraulic pressure amount QATON, namely, torque hydraulic pressure conversion value) is calculated based on the clutch torque TQON.

Next, the program proceeds to S248 and OFF side engagement pressure (clutch hydraulic pressure amount QATOF) is calculated in a similar manner.

On the other hand, if the determination at S240 is No, the program proceeds to S250 and whether or not the engagement processing terminates is determined. If the determination at S250 is No, the program proceeds to S246. If the determination at S250 is Yes, the program proceeds to S252 and termination processing of resetting the parameter, etc., is performed and the routine is exited.

Returning to the description of the flowchart of FIG. 3, the program proceeds to S104 and an upshift (UP) setting term is calculated.

Figure 16:
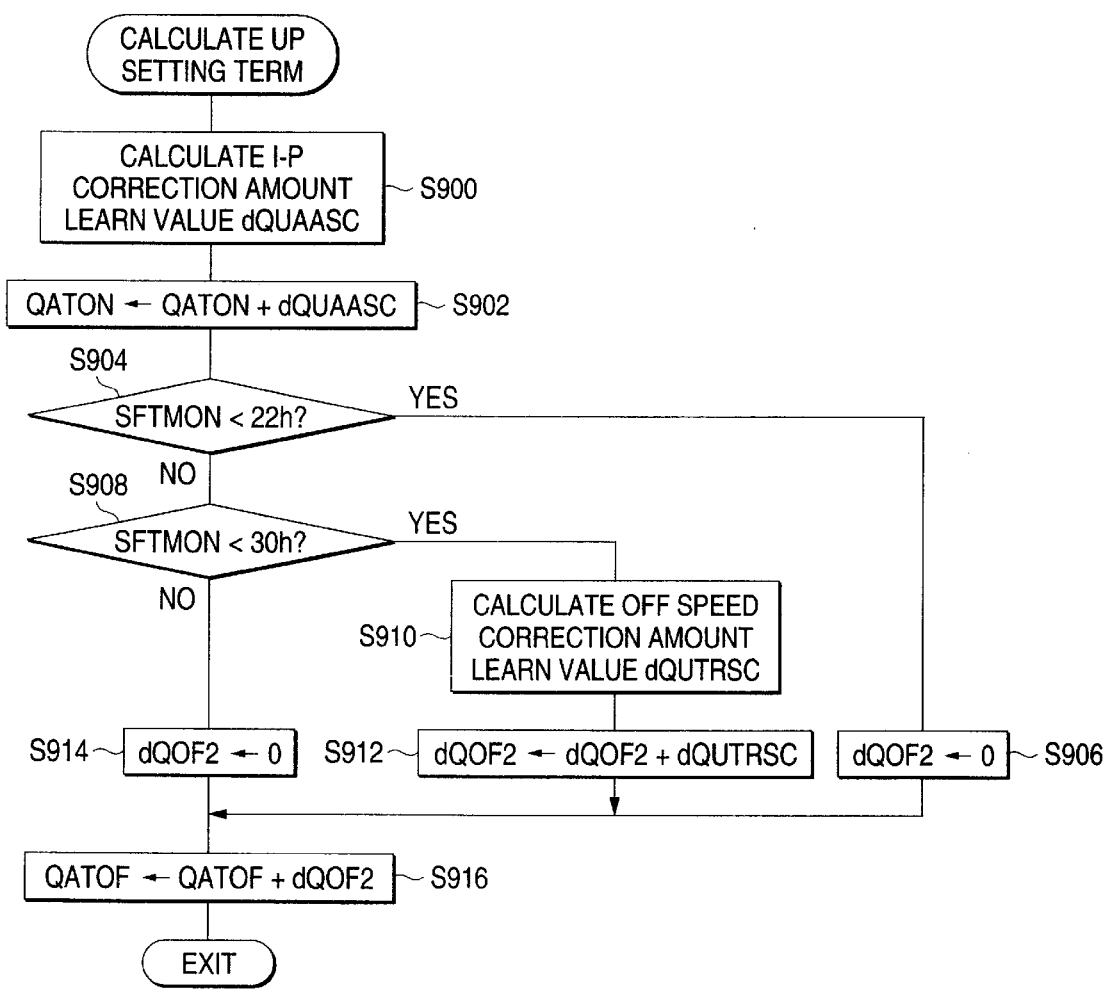
FIG. 16 is a subroutine flowchart showing upshift (UP) setting term calculation processing in the flowchart of FIG. 3.

FIG. 16 is a subroutine flowchart showing the setting term calculation processing.

In FIG. 16, at S900, I-P correction amount learn value dQUAASC is calculated.

Figure 17:
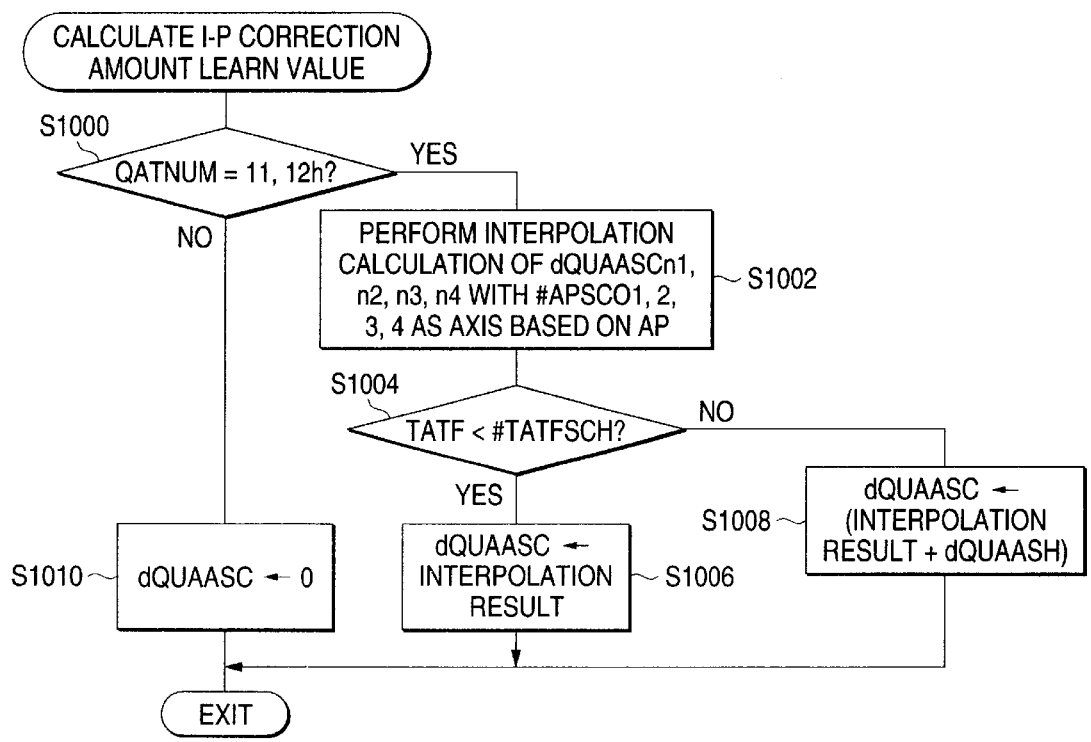
FIG. 17 is a subroutine flowchart showing I-P correction amount learn value calculation processing in the flowchart of FIG. 16.

FIG. 17 is a subroutine flowchart showing the I-P correction amount learn value calculation processing.

Figure 18:
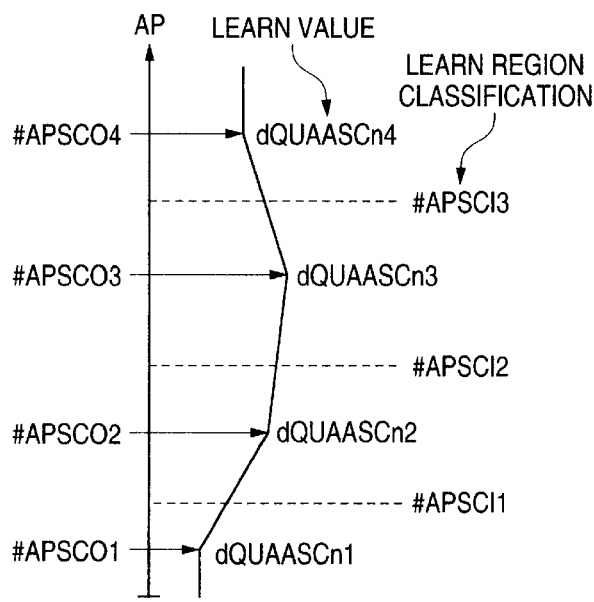
FIG. 18 is a graph to describe processing in the flowchart of FIG. 17.

In FIG. 17, at S1000, whether or not QATNUM=11h or 12h, namely, the shift mode is the first-to-second or second-to-third gear upshift is determined. If the determination at step S1000 is Yes, the program proceeds to S1002 at which a table shown in FIG. 18 is searched based on the detected accelerator opening AP and I-P correction amount learn value dQUAASC is calculated with #APSCO1, 2, 3, 4 as an axis and more particularly interpolation calculation of dQUAASCn1, n2, n3, n4 is performed and the I-P correction amount learn value dQUAASC is calculated.

That is, as previously described with reference to FIG. 9, only four I-P correction amount learn values provided by learning described later are stored in the table in response to the accelerator opening and the adjacent stored values are interpolated based on the detected accelerator opening and the I-P correction amount learn value is calculated.

Next, the program proceeds to S1004 and whether or not the detected oil temperature TATF is less than the predetermined value TATFSCH is determined. If the determination at S1004 is Yes, the program proceeds to S1006 and the interpolation result is adopted as the I-P correction amount learn value dQUAASC; if the determination at S1004 is No, the program proceeds to S1008 and a predetermined value dQUAASH is added to the interpolation result and the addition result is adopted as the I-P correction amount learn value dQUAASC. The reason why the correction amount when the oil temperature is high is made separate is that if a learn value is determined to cope with raising the engine rotation speed at high oil temperature time, it becomes too large as the correction amount in the normal shift control state at non-high oil temperature time, as described above. If the determination at S1000 is No, the program proceeds to S1010 and the I-P correction amount learn value dQUAASC is set to 0.

Returning to the description of the flowchart of FIG. 16, the program proceeds to S902 and the calculated I-P correction amount learn value dQUAASC is added to QATON and the sum is adopted as the ON side clutch hydraulic pressure QATON. Thus, the ON side clutch hydraulic pressure QATON is supplied at the next upshift time.

Next, the program proceeds to S904 and whether or not the value of SFTMON is less than 22h, in other words, whether or not the time is shelf pressure control time is determined. If the determination at S904 is Yes, the program proceeds to S906 and the value of correction amount dQOF2 is set to zero.

On the other hand, the determination at S904 is No, the program proceeds to S908 and whether or not the value of SFTMON is less than 30h, in other words, whether or not the phase is torque phase is determined. If the determination at S908 is Yes, the program proceeds to S910 and off speed correction amount learn value dQUTRSC is calculated.

Figure 19:
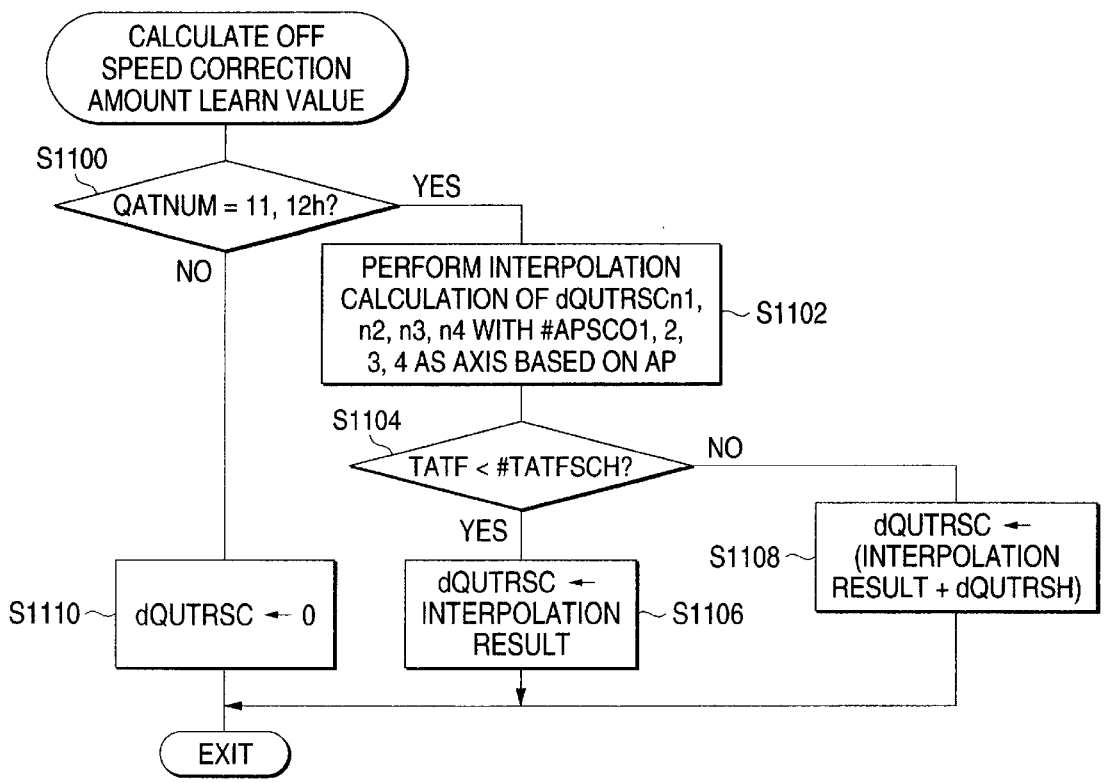
FIG. 19 is a subroutine flowchart showing off speed correction amount learn value calculation processing in the flowchart of FIG. 16.

FIG. 19 is a subroutine flowchart showing the off speed correction amount learn value calculation processing.

Figure 20:
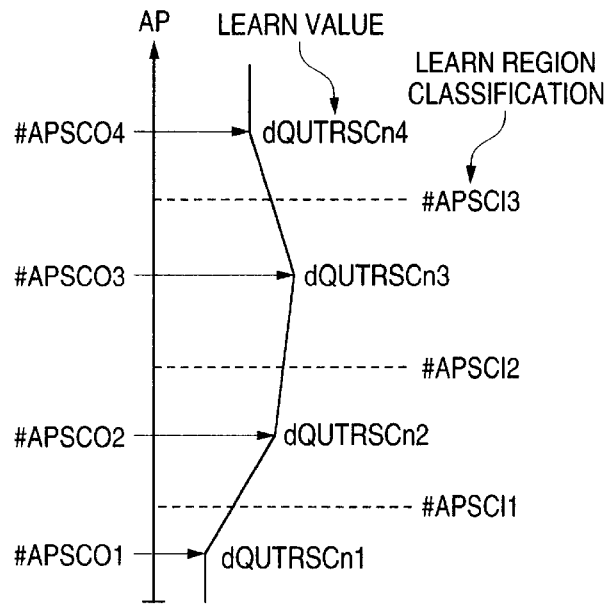
FIG. 20 is a graph to describe processing in the flowchart of FIG. 19.

In FIG. 19, at S1100, whether or not QATNUM=11h or 12h is determined. If the determination at step S1100 is Yes, the program proceeds to S1102 at which a table shown in FIG. 20 is searched based on the detected accelerator opening AP and learn off speed dQUTRSC is calculated with #APSCO1, 2, 3, 4 as an axis and more particularly interpolation calculation of dQUTRSCn1, n2, n3, n4 is performed and the learn off speed dQUTRSC is calculated.

That is, as previously described with reference to FIG. 9, only four off speed correction amount learn values provided by learning described later are stored in the table in response to the accelerator opening and the adjacent stored values are interpolated based on the detected accelerator opening and the off speed correction amount learn value is calculated.

Next, the program proceeds to S1104 and whether or not the detected TFT temperature TATF is less than the predetermined value TATFSCH is determined. If the determination at S1104 is Yes, the program proceeds to S1106 and the interpolation result is adopted as the off speed correction amount learn value dQUTRSC; if the determination at S1104 is No, the program proceeds to S1108 and a predetermined value dQUTRSH is added to the interpolation result and the addition result is adopted as the off speed correction amount learn value dQUTRSC. The reason why the correction amount when the oil temperature is high is made separate is that if a learn value is determined to cope with raising the engine rotation speed at high oil temperature time, it becomes too large as the correction amount in the normal shift control state at non-high oil temperature time, as described above. If the determination at S1100 is No, the program proceeds to S1110 and the off speed correction amount learn value dQUTRSC is set to 0.

Returning to the description of the flowchart of FIG. 16, the program proceeds to S912 and the calculated off speed correction amount learn value dQUTRSC is added to correction amount dQOF2 for increment correction. If the determination at S908 is No, the program proceeds to S914 and the correction amount dQOF2 is set to 0. Next, the program proceeds to S916 and the correction amount dQOF2 is added to the OFF side (release side) clutch hydraulic pressure amount QATOF for correction. Based on the learn value thus calculated, the OFF side (release side) clutch hydraulic pressure amount QATOF is corrected at the next upshift time.

Returning to the description of the flowchart of FIG. 3, the program proceeds to S106 and upshift (UP) learn control is performed.

Figure 21:
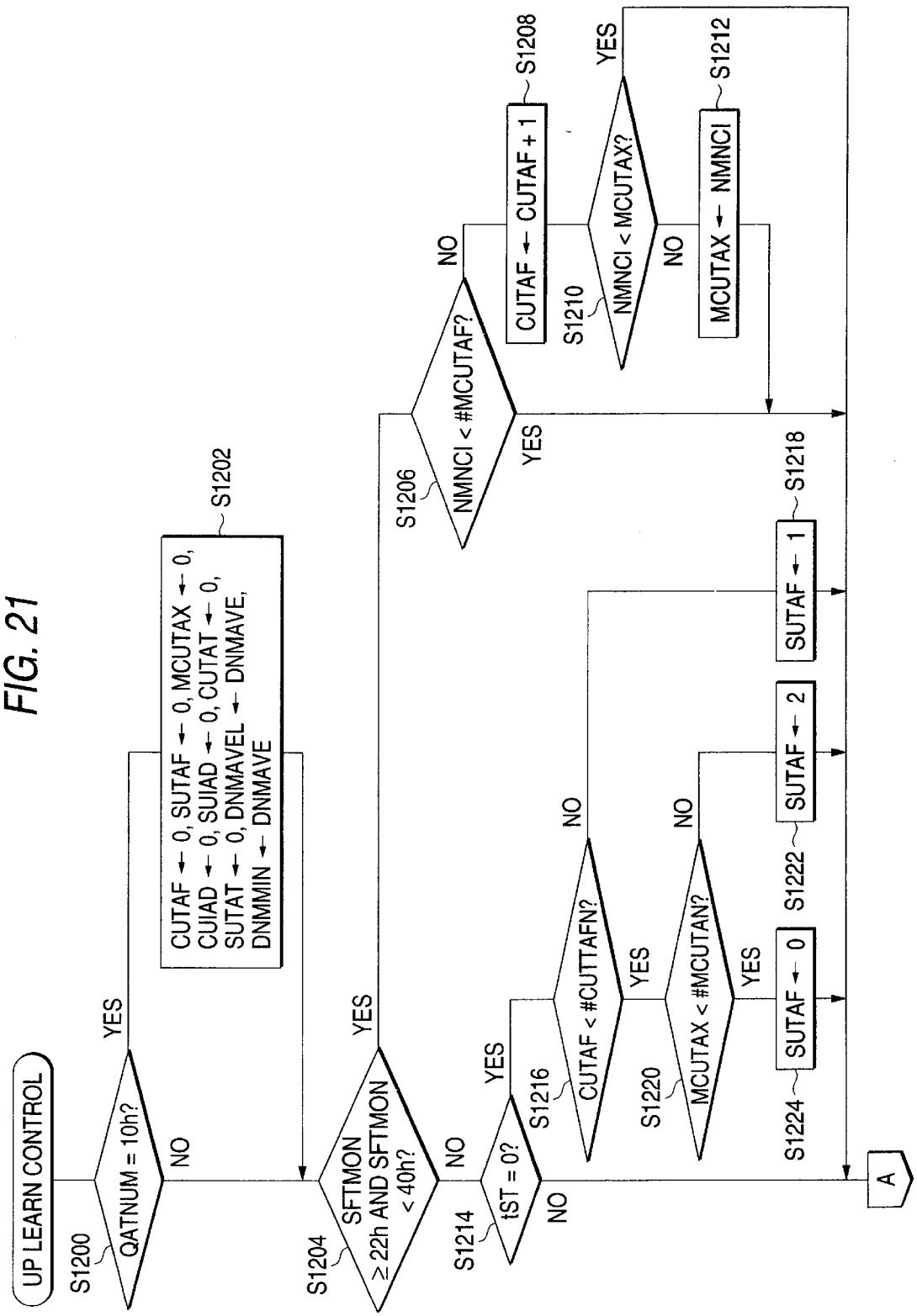
FIG. 21 is the first half of a subroutine flowchart showing upshift (UP) learn control in the flowchart of FIG. 3.

FIG. 21 is a subroutine flowchart showing the upshift (UP) learn control processing.

In FIG. 21, at S1200, whether or not QATNUM=10h, namely, the shift mode is the first shift is determined. If the determination at S1200 is No, the program proceeds to S1202 and the values of variables later used are reset to 0. Then, the program proceeds to S1204 and whether the value of SFTMON (shown in FIG. 5) is equal to or greater than 22h and less than 40h is determined. If the determination at S1204 is Yes, the program proceeds to S1206 and whether or not calculated clutch difference rotation NMNCI is less than a predetermined value #MCUTAF is determined. That is, the raising of the engine rotation speed is sensed.

The predetermined value #MCUTAF is a threshold value appropriately set to sense the raising of the engine rotation speed. Thus, if the calculated clutch difference rotation exceeds the value, it is determined that the raising of the engine rotation speed occurs. Then, the program proceeds to S1208 and the value of a raising counter CUTAF is incremented.

Next, the program proceeds to S1210 and whether or not the calculated clutch difference rotation is less than the raising difference rotation maximum value MCUTAX (reset to zero at S1202) is determined. If the determination at S1210 is No, the program proceeds to S1212 and the calculated clutch difference rotation is adopted as the raising difference rotation maximum value MCUTAX. Thus, whenever raising of the engine rotation speed is detected at S1206, the time is measured and the maximum value of clutch difference rotation is calculated.

On the other hand, if the determination at S1204 is No, the program proceeds to S1214 and whether or not the value of a shift termination timer tST is zero is determined. The timer has a value set to zero when shift terminates normally. Thus, if the determination at S1214 is Yes, it is determined that the shift terminates normally. Then, the program proceeds to S1216 and whether or not the value of the counter CUTAF is less than a predetermined value #CUTAFN is determined. That is, whether or not the duration of raising the engine rotation speed is less than a predetermined time (#CUTAFN equivalent value) is determined.

Figure 22:
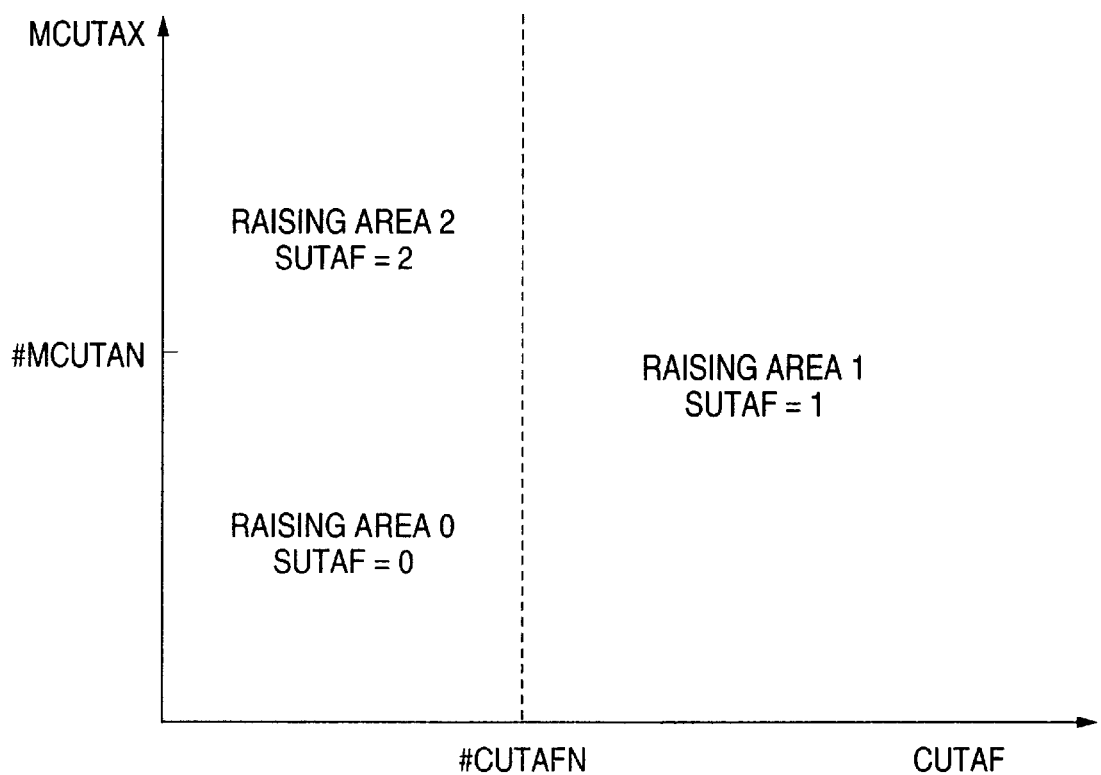
FIG. 22 is a graph showing raising area determination processing in the flowchart of FIG. 21.

If the determination at S1216 is No, it is determined that raising of the engine rotation speed continues for the predetermined time or more. Then, the program proceeds to S1218 and raising area is set to 1. FIG. 22 is a graph showing raising areas. The raising areas are classified based on the counter value and the maximum value of raising difference rotation, as shown in the figure.

If the determination at S1216 is Yes, the program proceeds to S1220 and whether or not MCUTAX is less than a predetermined value #MCUTAN is determined. If the determination at S1220 is No, it is determined that the clutch difference rotation is large. Then, the program proceeds to S1222 and raising area is set to 2. If the determination at S1220 is Yes, it is determined that raising of the engine rotation speed does not pose any problem. Then, the program proceeds to S1224 and raising area is set to 0.

If the determination at S1206 is Yes or if the determination at S1214 is No, steps S1216 to S1224 are skipped.

Figure 23:
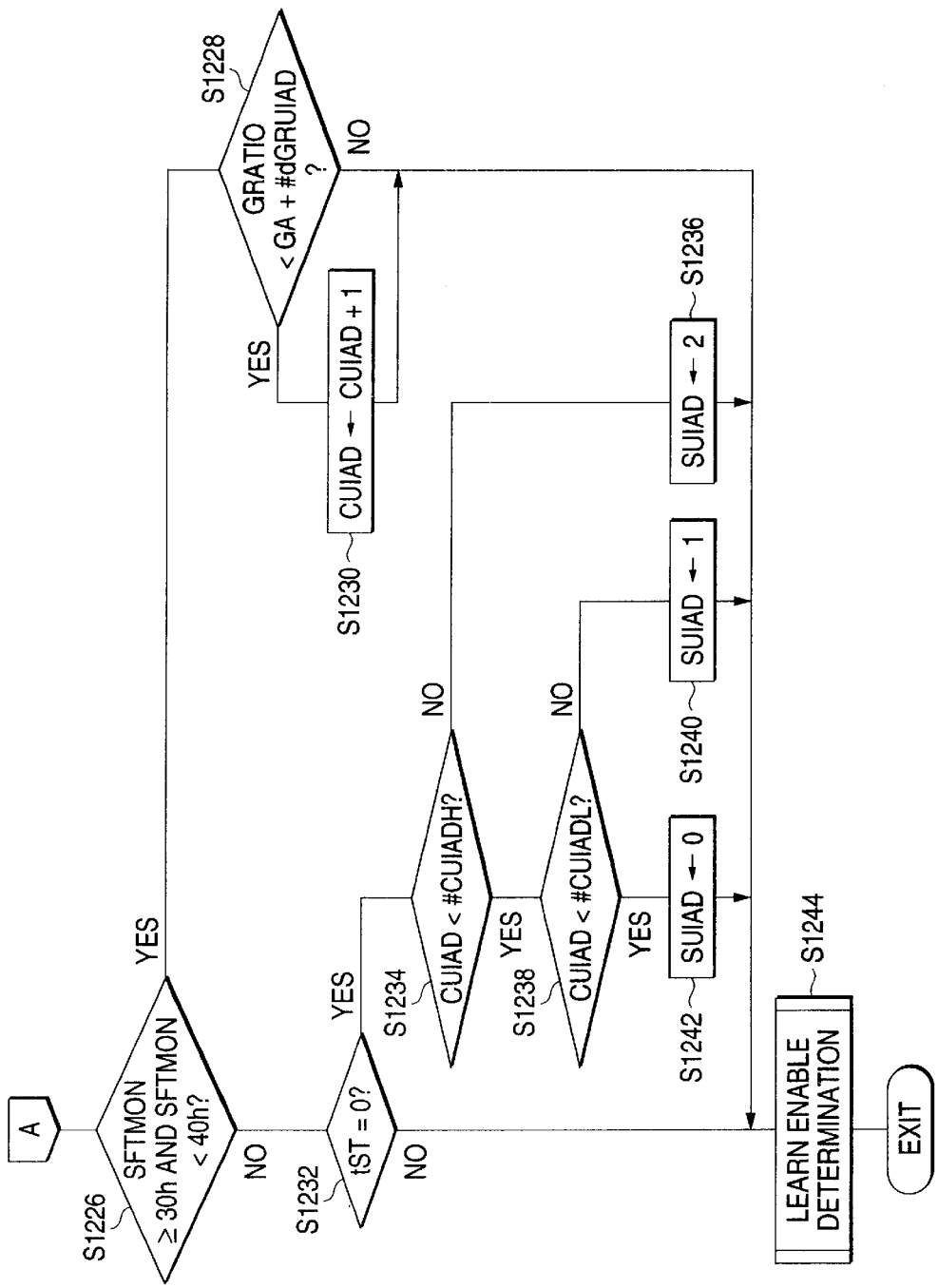
FIG. 23 is the latter half of the subroutine flowchart showing the upshift (UP) learn control in the flowchart of FIG. 3.

Next, the program proceeds to S1226 in FIG. 23 and whether the value of SFTMON is equal to or greater than 30h and less than 40h is determined. If the determination at S1226 is Yes, the program proceeds to S1228 and whether or not the value of GRATIO is less than the sum of destination step GA and a predetermined value #dGRUIAD, in other words, whether or not the clutch starts to slide is determined. If the determination at S1228 is Yes, the program proceeds to S1230 and the value of an I phase (inertia phase) delay counter CUIAD is incremented. That is, the inertia phase start time is judged and whether or not the inertia phase is started properly is determined.

Figure 24:
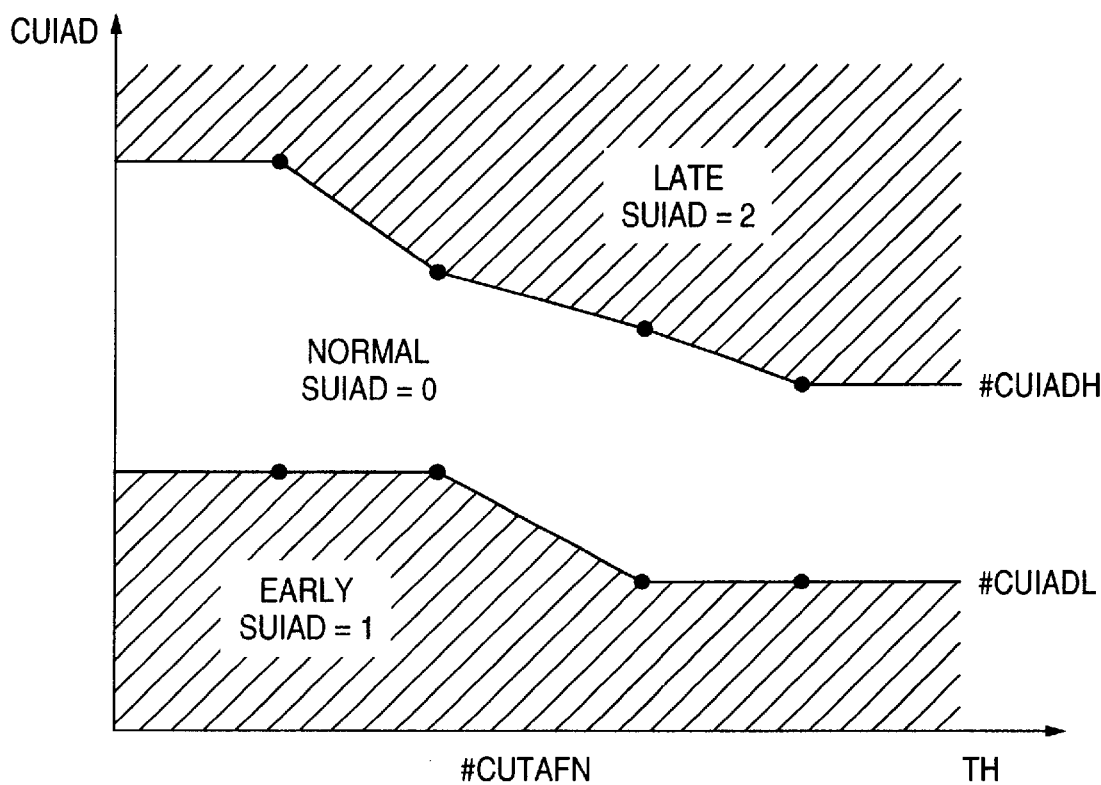
FIG. 24 is a graph showing I phase delay area determination processing in the flowchart of FIG. 23.

If the determination at S1226 is No, the program proceeds to S1232 and whether or not the value of the timer tST is zero, namely, whether or not the shift terminates normally is determined. If the determination at S1232 is Yes, the program proceeds to S1234 and whether or not the counter value is less than a first predetermined value #CUIADH is determined. The first predetermined value #CUIADH is a threshold value appropriately set to sense that the inertia phase starts with delay. Thus, if the determination at S1234 is No and the counter value exceeds the value #CUIADH, it is determined that the inertia phase start time is late (not proper), and the program proceeds to S1236 and I phase delay area is set to 2. FIG. 24 is a graph showing the I phase delay areas. The I phase delay areas are classified based on the value of the delay counter CUIAD and the throttle opening TH, as shown in the figure.

If the determination at S1234 is Yes, the program proceeds to S1238 and whether or not the counter value is less than a second predetermined value #CUIADL is determined. The second predetermined value #CUIADL is a threshold value appropriately set to sense that the inertia phase starts early. Thus, if the determination at S1238 is Yes and the counter value is less than the value #CUIADL, it is determined that the inertia phase start time is early (not proper), and the program proceeds to S1240 and I phase delay area is set to 1.

If the determination at S1238 is No, it is determined that the inertia phase delay does not pose any problem. Then, the program proceeds to S1242 and I phase delay area is set to 0. If the determination at S1228 is No or if the determination at S1232 is No, steps S1234 to S1242 are skipped.

Next, the program proceeds to S1244 and learn enable determination is made. This work means a work for determining a learn enable area and updating a learn value.

Figure 25:
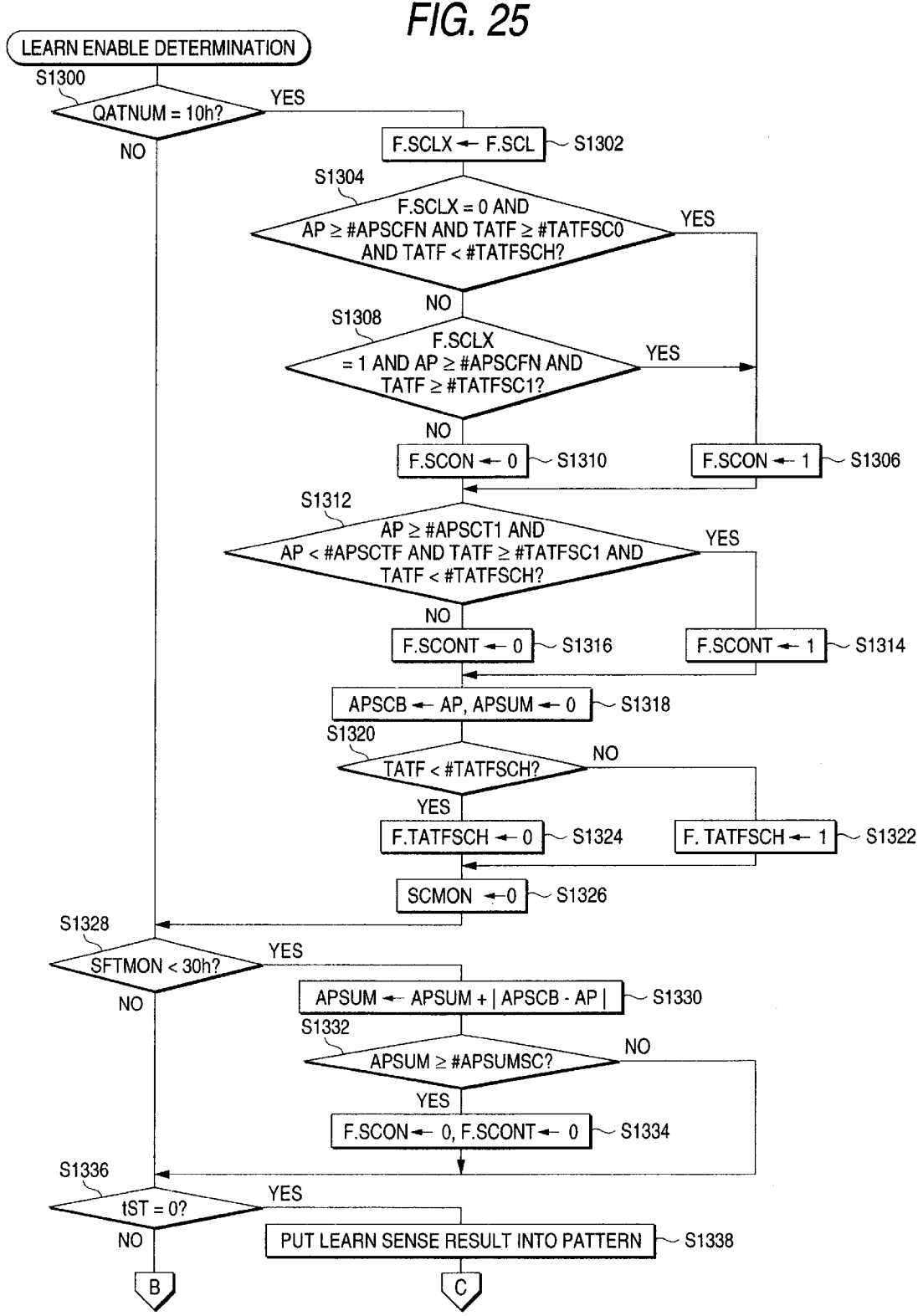
FIG. 25 is the first half of a subroutine flowchart showing learn enable determination processing in the flowchart of FIG. 24.

FIG. 25 is a subroutine flowchart showing the work.

In FIG. 25, at S1300, again whether or not QATNUM= 10h, namely, the shift mode is the first upshift is determined. If the determination at S1300 is Yes, the program proceeds to S1302 and a normal learn mode flag F.SCL is rewritten as F.SCLX. When the F.SCL or F.SCLX bit is set to 1, the normal learn mode is assumed to be specified; when the bit is reset to 0, initial learn mode is assumed to be specified.

Next, the program proceeds to S1304 and whether the bit of the flag F.SCLX is 0, the detected accelerator opening AP is equal to or greater than a predetermined value (raising determination lower limit accelerator opening) #APSCFN, the detected oil temperature TATF is equal to or greater than a predetermined value (initial learn raising determination lower limit oil temperature) #TATFSCO and is less than a predetermined value (high oil temperature learn threshold value) #TATFSCH is determined. If the determination at S1304 is Yes, the program proceeds to S1306 and the bit of F.SCON is set to 1.

On the other hand, if the determination at S1304 is No, the program proceeds to S1308 and whether the bit of the flag F.SCLX is 1, the detected accelerator opening AP is equal to or greater than the predetermined value#APSCFN, and the detected oil temperature TATF is equal to or greater than a predetermined value (normal learn raising determination lower limit oil temperature) #TATFSC1 is determined.

If the determination at S1308 is Yes, the program proceeds to S1306 and if the determination at S1308 is No, the program proceeds to S1310 and the bit of the flag F.SCON is reset to 0. When the flag bit is set to 1, it means that learn raising update is enabled; when the flag bit is reset to 0, it means that learn raising update is not enabled.

Next, the program proceeds to S1312 and whether the detected accelerator opening AP is equal to or greater than a predetermined value (initial learn I phase delay determination lower limit accelerator opening) #APSCT1 and is less than a predetermined value (normal learn I phase delay determination lower limit accelerator opening) #APSCTF and the detected oil temperature TATF is equal to or greater than a predetermined value (initial I phase delay determination lower limit oil temperature) #TATFSC1 and is less than the predetermined value (high oil temperature learn threshold value) #TATFSCH is determined.

If the determination at S1312 is Yes, the program proceeds to S1314 and the bit of F.SCONT is set to 1. If the determination at S1312 is No, the program proceeds to S1316 and the bit of the flag F.SCONT is reset to 0. When the flag bit is set to 1, it means that learn I phase delay update is enabled; when the flag bit is reset to 0, it means that learn I phase delay update is not enabled.

Next, the program proceeds to S1318 and the detected accelerator opening AP is rewritten as update reference accelerator opening APSCB and the value of accelerator opening change amount integral APSUM is initialized to 0.

Next, the program proceeds to S1320 and whether or not the detected oil temperature TATF is less than the predetermined value #TATFSCH is determined. If the determination at S1320 is No and the oil temperature is determined high, the program proceeds to S1322 and the bit of a flag F.TATF-SCH is set to 1. If the determination at S1320 is Yes, the program proceeds to S1324 the bit of the flag F.TATFSCH is reset to 0. When the flag bit is set to 1, it means that high oil temperature learning is executed; when the flag bit is reset to 0, it means that high oil temperature learning is not executed.

Next, the program proceeds to S1326 and the value of learn monitor SCMON is reset to zero. If the determination at S1300 is Yes, steps S1302 to S1326 are skipped.

Next, the program proceeds to S1328 and whether or not the value of SFTMON is less than 30h is determined. If the determination at S1328 is Yes, the program proceeds to S1330 and the absolute value of the difference between the update reference accelerator opening APSCB and the detected accelerator opening AP is added to the accelerator opening change amount integral APSUM to calculate the accelerator opening change amount integral APSUM.

Next, the program proceeds to S1332 and whether or not the calculated accelerator opening change amount integral APSUM is equal to or greater than a predetermined value #APSUMSC is determined. If the determination at S1332 is Yes, the program proceeds to S1334 and the bits of the flags F.SCON and F.SCONT are reset to 0. That is, learning is stopped in a state in which accelerator opening change is large as the driver operates the accelerator pedal intermittently. If the determination at S1328 is No, steps S1330 to S1334 are skipped.

Next, the program proceeds to S1336 and whether or not the value of the timer tST is zero is determined. If the determination at S1336 is Yes and it is determined that the shift terminates normally, the program proceeds to S1338 and the learn result (event) is put into a pattern and the value of the learn monitor SCMON is determined accordingly.

More particularly, the value of the learn monitor SCMON is determined as follows:

| F.SCON | SUTAF | F.SCONT | SUIAD | SCMON |
|--------|-------|---------|-----------|-------|
| 1 | 0 | 1 | 1 (early) | 94h |
| 1 | 0 | 1 | 2 (late) | 98h |
| 1 | 1 | | | A0h |
| 1 | 2 | 0 | | C0h |
| 1 | 2 | 1 | 0 | D0h |
| 1 | 2 | 1 | 1 (early) | D4h |
| 1 | 2 | 1 | 2 (late) | D8h |

Next, the program proceeds to S1340 and whether or not the value of SCMON is any of A0h, C0h, or D0h is determined. If the determination at S1340 is Yes, it is determined that raising of the engine rotation speed occurs and it is necessary to preferentially take a measure against raising the engine rotation speed. Then, the program proceeds to S1342 and whether or not the bit of the flag F.SCLX is 0, in other words, whether or not the learn mode is initial learn is determined.

In the embodiment, the learn mode is initial learn at the factory shipment and when shifting with no raising of the engine rotation speed continues three times or more, the learn mode makes a transition to normal learn when the oil temperature reaches a predetermined value (for example, 70° C.) or more, as described later. After the learn mode makes the transition to the normal learn, if the installed battery is removed, again the learn mode is restored to the initial learn.

If the raising of the engine rotation speed occurs during the initial learning, learning is executed in proportion to the degree of raising and the preparation time (torque phase time) is prolonged for enhancing toughness against raising the engine rotation speed. On the other hand, a given amount of learning (step learn) is executed during the normal learning so that an excessive correction is not made.

If the determination at S1342 is Yes and it is determined that the learn mode is the initial mode, the program proceeds to S1344 and a preparation time learn correction is made, namely, the preparation time correction amount learn value is updated.

FIG. 27 is a subroutine flowchart showing the preparation time learn correction processing.

In FIG. 27, at S1400, the product resulting from multiplying the raising difference rotation maximum value MCUTAX by a coefficient #KMCUTAX1 is added to the product resulting from multiplying the raising counter value CUTAF by a coefficient #KCUTAF1 and the sum is adopted as preparation time correction amount tmupas.

That is, the preparation time correction learn value is calculated by multiplying the parameters CUTAF and MCUTAX indicating the raising of the engine rotation speed by the coefficients #KCUTAF1 and #KMCUTAX1 respectively, in other words, so as to be proportional to the degree of raising of the engine rotation speed. The value is added at the next upshift time at S408 in FIG. 7.

Next, the program proceeds to S1402 and whether or not QATNUM is 11h or 12h is determined. If the determination at S1402 is No, the subsequent steps are skipped. If the determination at S1402 is Yes, the program proceeds to S1404 and the calculated preparation time correction amount tmupas is added to the preparation time correction amount learn value TMUPASC (more particularly, TMUPASCn1 to n4) for increment correction (update).

Figure 26:
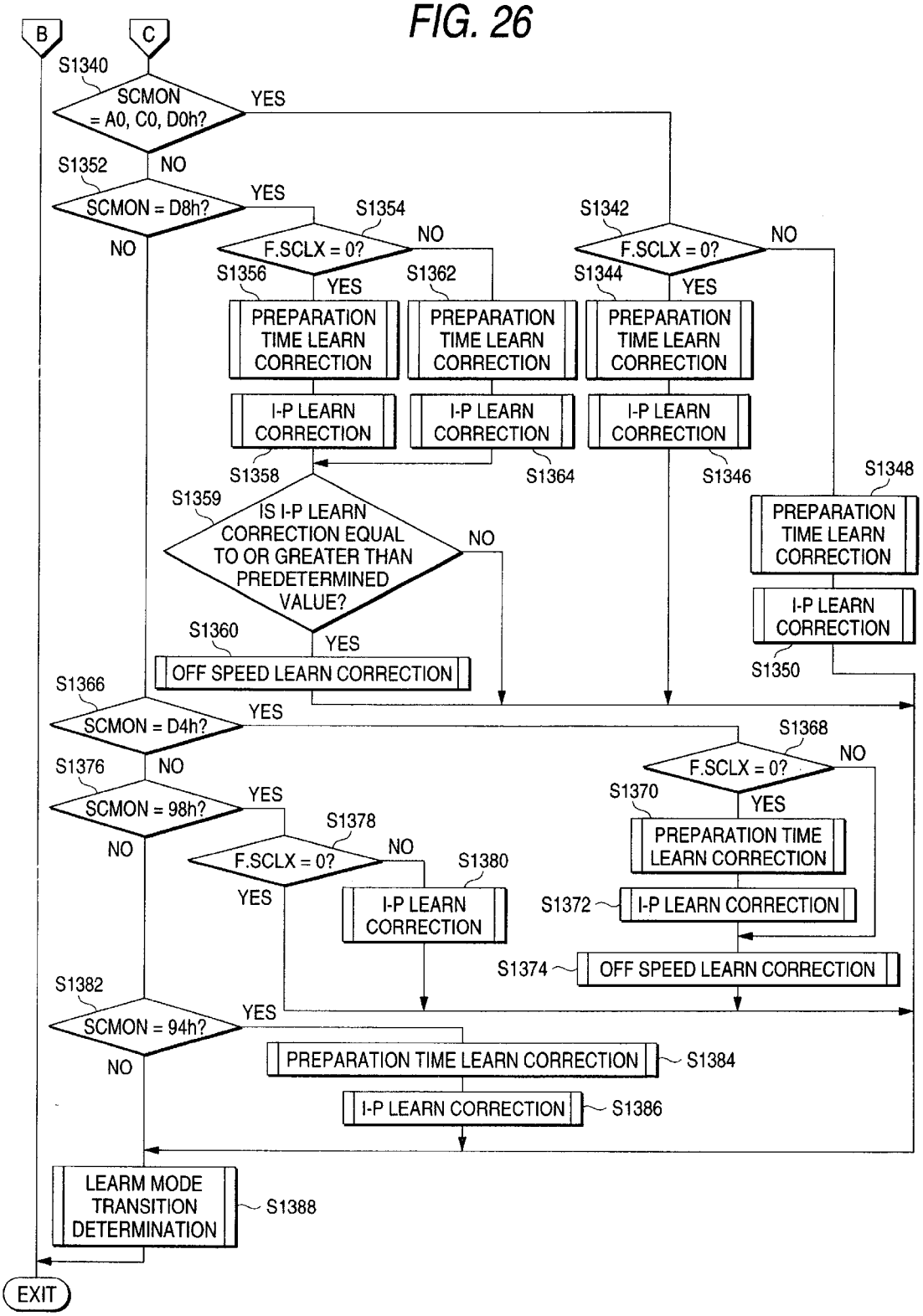
FIG. 26 is the latter half of the subroutine flowchart showing the learn enable determination processing in the flowchart of FIG. 24.

Returning to the description of the flowchart of FIG. 26, the program proceeds to S1346 and an I-P learn correction is made, namely, the I-P correction amount learn value is updated.

FIG. 28 is a subroutine flowchart showing the I-P learn correction processing.

In FIG. 28, at S1500, the product resulting from multiplying the raising difference rotation maximum value McuTAX by a predetermined value #KMCUTAX2 is added to the product resulting from multiplying the raising counter value CUTAF by a predetermined value #KCUTAF2 (in other words, the products provided so as to be proportional to the degree of raising of the engine rotation speed are added) and the sum is adopted as I-P correction value dquaas.

Next, the program proceeds to S1502 and whether or not QATNUM is 11h or 12h is determined. If the determination at S1502 is No, the subsequent steps are skipped. If the determination at S1502 is Yes, the program proceeds to S1504 and the calculated I-P correction amount dquaas is added to the I-P correction amount learn value dQUAASC (more particularly, dQUAASCn1 to n4) for increment correction (update). Based on the learn value, the ON side hydraulic pressure in the torque phase is increased accordingly as a whole as shown in FIG. 11 at the next upshift (S902 in FIG. 16).

Returning to the description of the flowchart of FIG. 26, if the determination at S1342 is NO and it is determined that the learn mode is the normal learn, the program proceeds to S1348 and a preparation time learn correction is made, namely, the preparation time correction amount learn value is updated.

Figure 29:
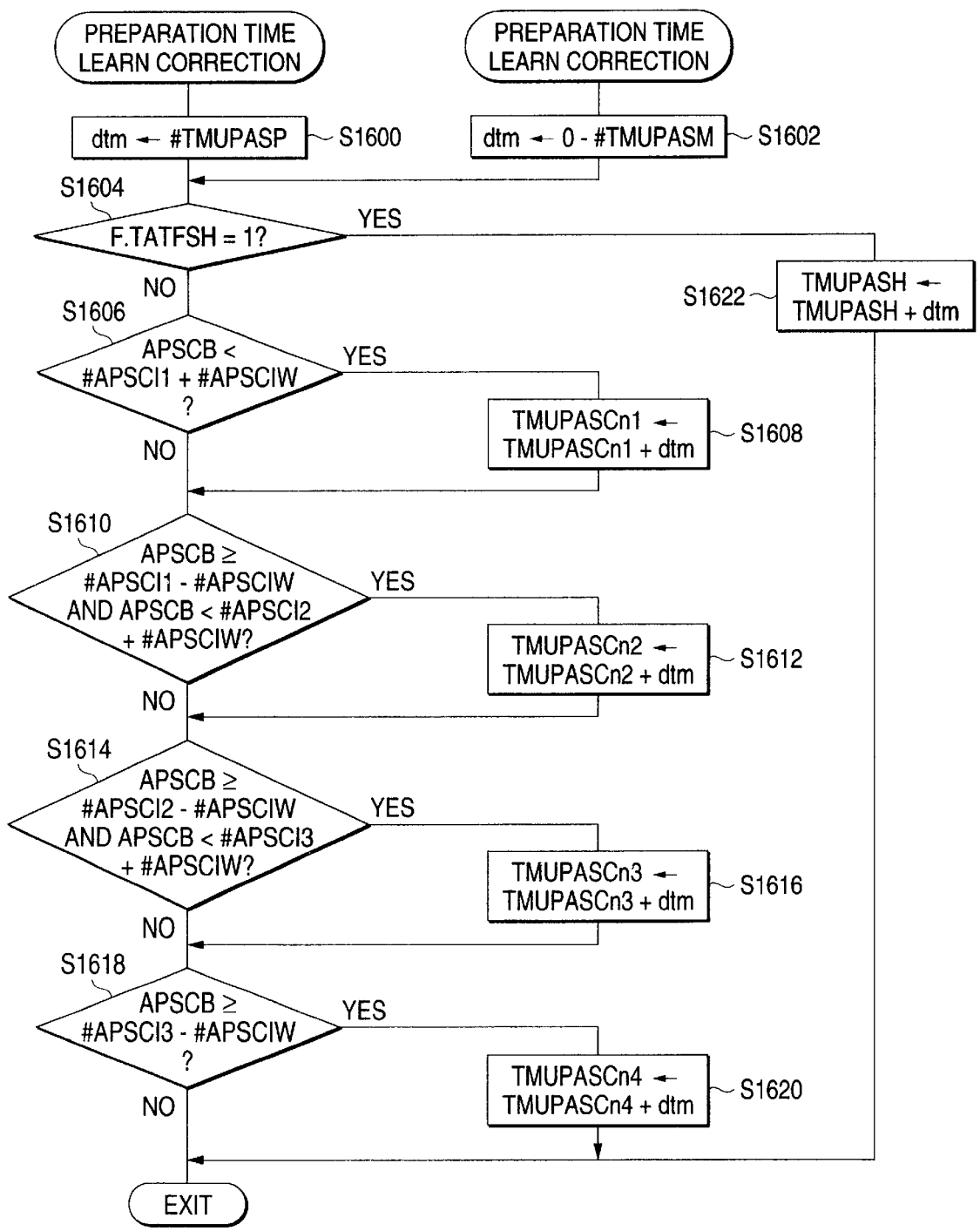
FIG. 29 is a subroutine flowchart showing preparation time learn correction processing in normal learn in the flowchart of FIG. 26.

FIG. 29 is a subroutine flowchart showing the preparation time learn correction processing.

Figure 35:
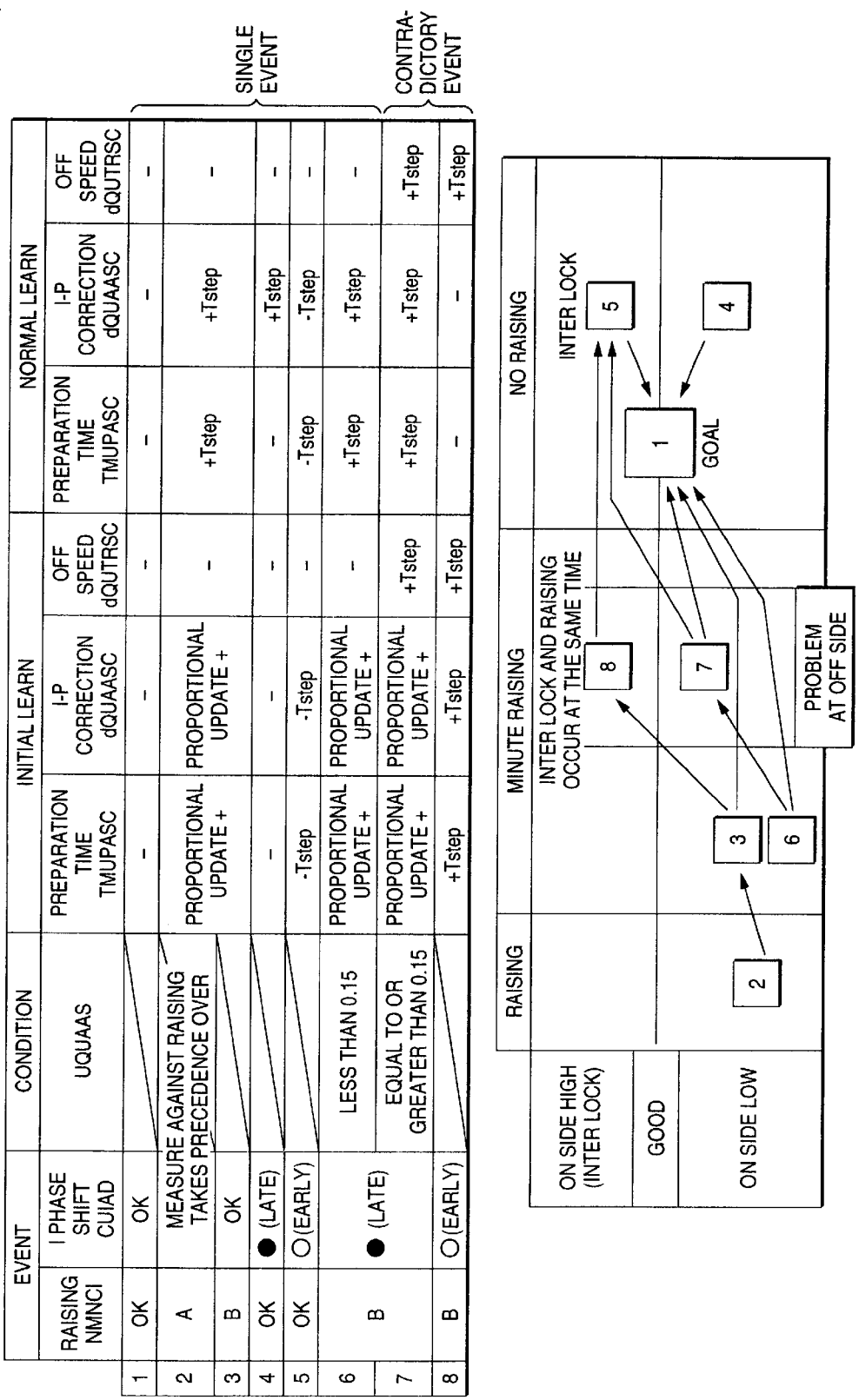
FIG. 35 is a schematic representation to describe processing in the flowchart of FIG. 26.

In FIG. 29, if the preparation time correction amount learn value is a positive value according to the positive/negative determination result provided by referencing data later described with reference to FIG. 35 at the proceeding of the previous step S1340, the program proceeds to S1600 and a predetermined value #TMUPASP (step amount, fixed value) is replaced with a value dtm (positive value). If the preparation time correction amount learn value is a negative value, the program proceeds to S1602 and a predetermined value #TMUPASM (step amount, fixed value) is subtracted from 0 and the subtraction result is replaced with dtm (negative value).

Figure 30:
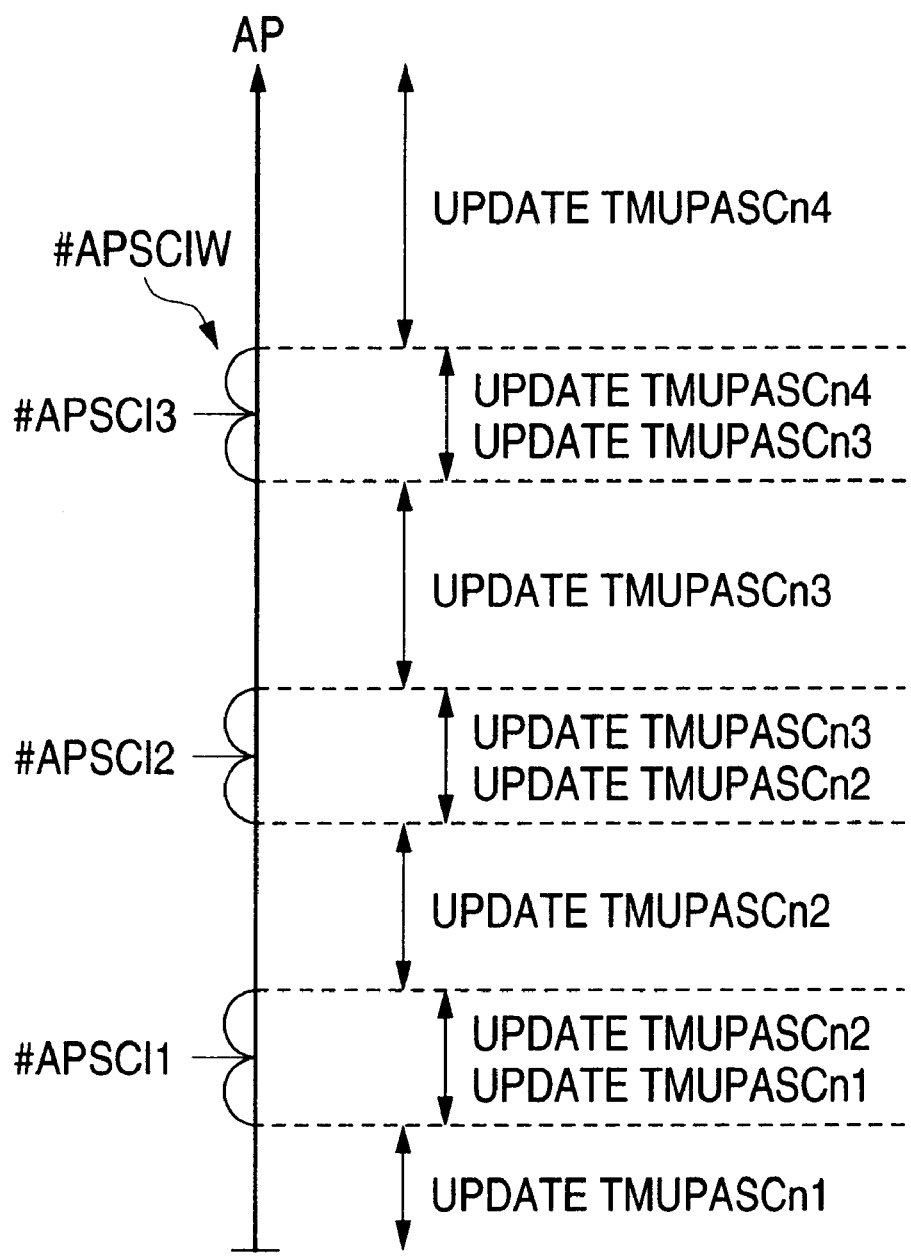
FIG. 30 is a graph to describe processing in the flowchart of FIG. 29.

Next, the program proceeds to S1604 and whether or not the bit of the flag F.TATFSH is set to 1, in other words, the oil temperature is high is determined. If the determination at S1604 is No, the program proceeds to S1606 and whether or not the update reference accelerator opening APSCB is less than the sum of a predetermined value #APSCI1 and a minute value #APSCIW is determined. If the determination at S1606 is Yes, the program proceeds to S1608 and dtm is added (subtracted if the value dtm is a negative value) to update the preparation time correction amount learn value TMUPASC (more particularly, TMUPASCn1). FIG. 30 shows the values. If the determination at S1606 is No, S1608 is skipped.

Next, the program proceeds to S1610 and whether or not the update reference accelerator opening APSCB is equal to or greater than the result of subtracting the minute value #APSCIW from the predetermined value #APSCI1 and is less than the sum of a predetermined value #APSCI2 and the minute value #APSCIW is determined. If the determination at S1610 is Yes, the program proceeds to S1612 and the value dtm is added to update the preparation time correction amount learn value TMUPASC (more particularly, TMUPASCn2). If the determination at S1610 is No, S1612 is skipped.

Next, the program proceeds to S1614 and whether or not the update reference accelerator opening APSCB is equal to or greater than the result of subtracting the minute value #APSCIW from the predetermined value #APSCI2 and is less than the sum of a predetermined value #APSCI3 and the minute value #APSCIW is determined. If the determination at S1614 is Yes, the program proceeds to S1616 and the value dtm is added to update the preparation time correction amount learn value TMUPASC (more particularly, TMUPASCn3). If the determination at S1614 is No, S1616 is skipped.

Next, the program proceeds to S1618 and whether or not the update reference accelerator opening APSCB is equal to or greater than the result of subtracting the minute value #APSCIW from the predetermined value #APSCI3 is determined. If the determination at S1618 is Yes, the program proceeds to S1620 and the value dtm is added to update the preparation time correction amount learn value TMUPASC (more particularly, TMUPASCn4). If the determination at S1618 is No, S1620 is skipped. If the determination at S1604 is Yes, the program proceeds to S1622 and dtm is added to update the value TMUPASH for high oil temperature.

As seen in FIG. 30, the processing means updating the preparation time correction amount learn values across the two adjacent areas classified according to the accelerator opening. Thus, the preparation time correction amount learn value can be calculated at S506, S508 in FIG. 8 at the next upshift time so as to quickly respond to change in the accelerator opening as much as possible.

Returning to the description of the flowchart of FIG. 26, the program proceeds to S1350 and an I-P learn correction is made, namely, the I-P correction amount learn value is updated.

Figure 31:
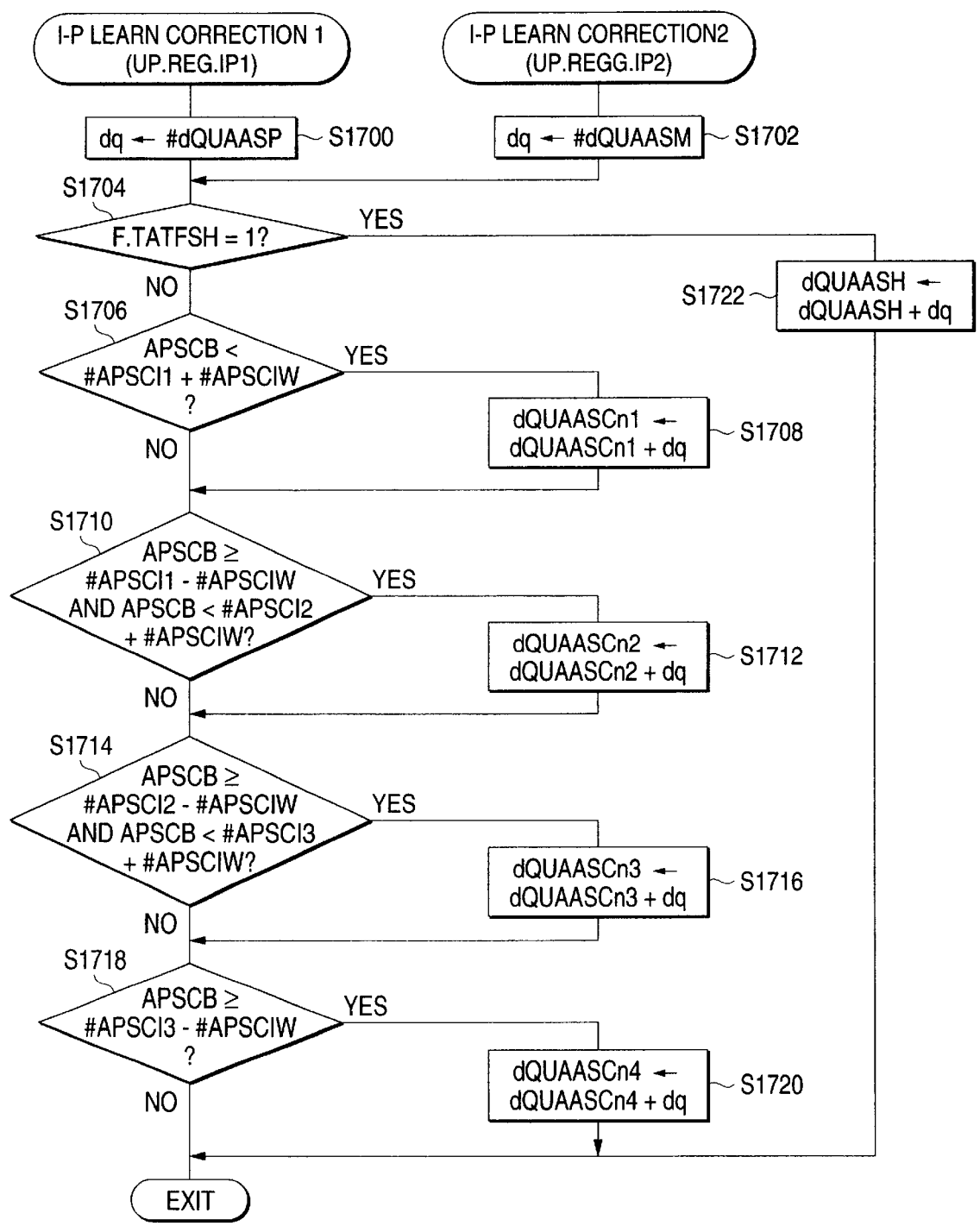
FIG. 31 is a subroutine flowchart showing I-P learn correction processing in normal learn in the flowchart of FIG. 26.

FIG. 31 is a subroutine flowchart showing the I-P learn correction processing.

In FIG. 31, if the I-P correction amount learn value is a positive value according to the positive/negative determination result provided by referencing data later described with reference to FIG. 35 as well as the proceeding at the previous step S1340, the program proceeds to S1700 and a predetermined value #dQUAASP (step amount, fixed value) is replaced with a valued q (positive value). If the I-P correction amount learn value is a negative value, the program proceeds to S1702 and a predetermined value #dQUAASM (step amount, fixed value) is replaced with value dq (negative value).

Figure 32:
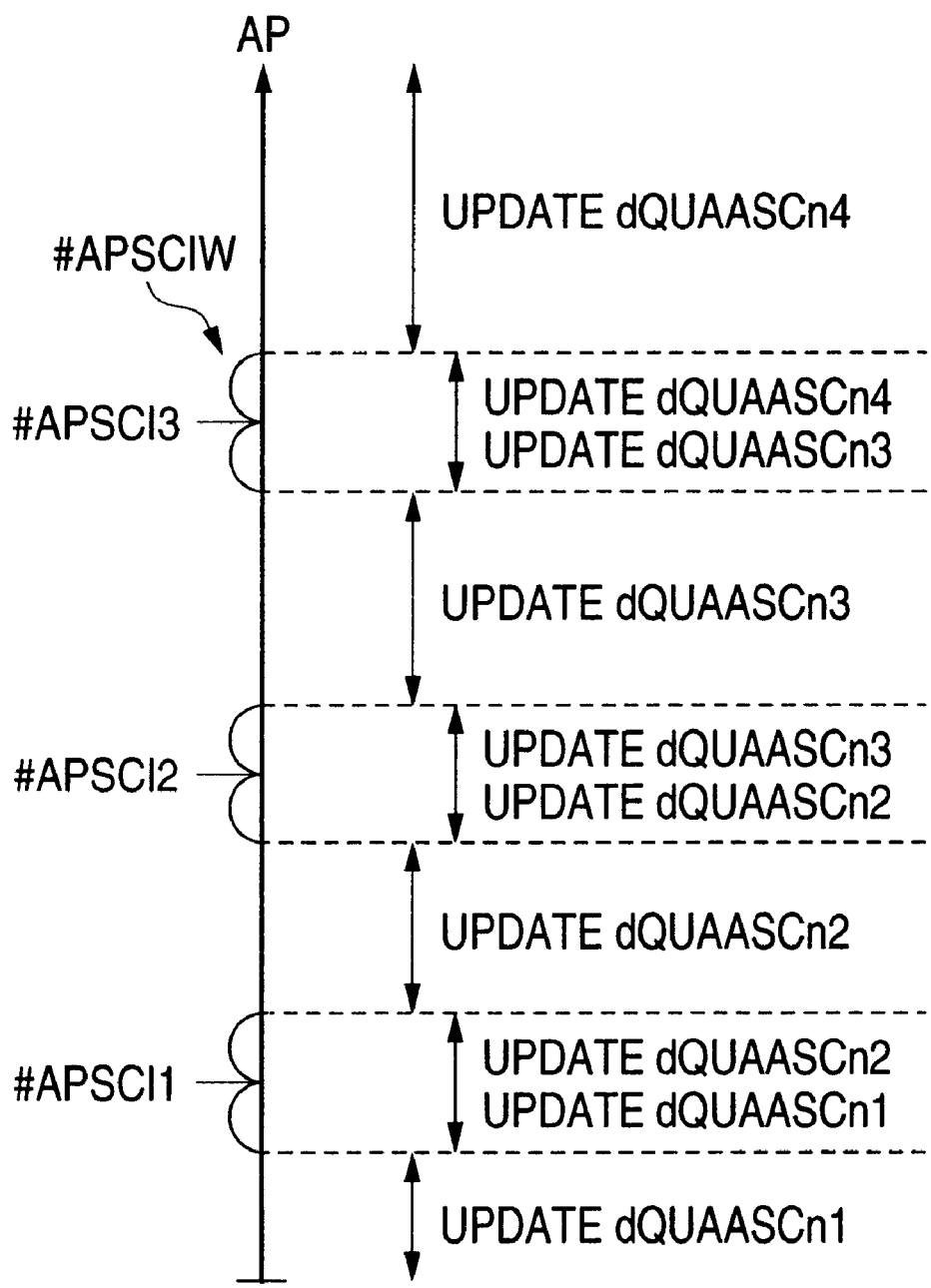
FIG. 32 is a graph to describe processing in the flowchart of FIG. 31.

Next, the program proceeds to S1704 and whether or not the bit of the flag F.TATFSH is set to 1, in other words, the oil temperature is high is determined. If the determination at S1704 is No, the program proceeds to S1706 and whether or not the update reference accelerator opening APSCB is less than the sum of the predetermined value #APSCI1 and the minute value #APSCIW is determined. If the determination at S1706 is Yes, the program proceeds to S1708 and dq is added (subtracted if the value dq is a negative value) to update the I-P correction amount learn valued QUAASC (more particularly, dQUAASCn1). FIG. 32 shows the values. If the determination at S1706 is No, S1708 is skipped.

Next, the program proceeds to S1710 and whether or not the update reference accelerator opening APSCB is equal to or greater than the result of subtracting the minute value #APSCIW from the predetermined value #APSCI1 and is less than the sum of the predetermined value #APSCI2 and the minute value #APSCIW is determined. If the determination at S1710 is Yes, the program proceeds to S1712 and the value dq is added to update the I-P correction amount learn value dQUAASC (more particularly, dQUAASCn2). If the determination at S1710 is No, S1712 is skipped.

Next, the program proceeds to S1714 and whether or not the update reference accelerator opening APSCB is equal to or greater than the result of subtracting the minute value #APSCIW from the predetermined value #APSCI2 and is less than the sum of the predetermined value #APSCI3 and the minute value #APSCIW is determined. If the determination at S1714 is Yes, the program proceeds to S1716 and the value dq is added to update the I-P correction amount learn value dQUAASC (more particularly, dQUAASCn3). If the determination at S1714 is No, S1716 is skipped.

Next, the program proceeds to S1718 and whether or not the update reference accelerator opening APSCB is equal to or greater than the result of subtracting the minute value #APSCIW from the predetermined value #APSCI3 is determined. If the determination at S1718 is Yes, the program proceeds to S1720 and the value dq is added to update the I-P correction amount learn value dQUAASC (more particularly, dQUAASCn4). If the determination at S1718 is No, S1720 is skipped. If the determination at S1704 is Yes, the program proceeds to S1722 and dq is added to update the value dQUAASH for high oil temperature.

As seen in FIG. 32, the processing means updating the I-P correction amount learn values across the two adjacent areas classified according to the accelerator opening. Thus, the I-P correction amount learn value can be calculated at the next upshift time at S1006, S1008 in FIG. 17 so as to quickly respond to change in the accelerator opening as much as possible.

Returning to the description of the flowchart of FIG. 26, if the determination at S1340 is No, the program proceeds to S1352 and whether or not the value of SCMON is D8h is determined. If the determination at S1340 is Yes, it is determined that the raising of the engine rotation speed occurs and it is necessary to take a measure against raising the engine rotation speed and the inertia phase start time is also late. Then, the program proceeds to S1354 and whether or not the bit of the flag F.SCLX is 0 is determined.

If the determination at S1354 is Yes, it is determined that the learn mode is the initial learn. Then, the program proceeds to S1356 and S1358 and processing similar to that at the previous steps S1344 and S1346 is performed. Next, the program proceeds to S1359 and whether or not the I-P learn correction is equal to or greater than a predetermined value, more particularly, the updated I-P correction amount learn value dQUAASC is equal to or greater than the predetermined value is determined. The predetermined value is, for example, a value of about a half of +0.3 kgf/cm$^2$, the maximum value of the ON side increment correction value set on the safety side described later, namely, +0.15 kgf/cm$^2$. However, the predetermined value can also be set appropriately to any value other than that value. If the determination at S1359 is Yes, the program proceeds to S1360 and an off speed learn correction is made, namely, the off speed correction amount learn value is updated. (If the determination at S1359 is No, S1360 is skipped.)

Figure 33:
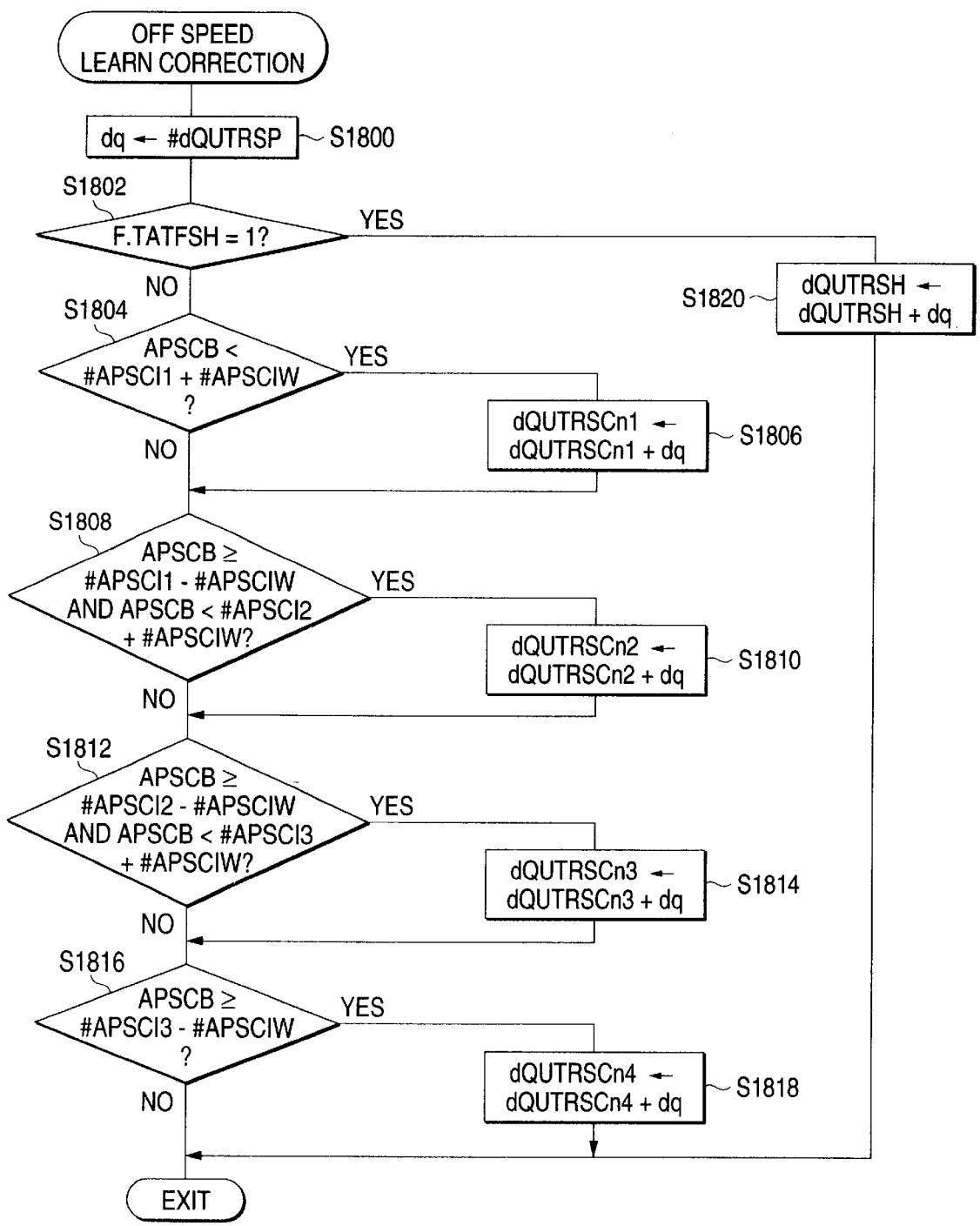
FIG. 33 is a subroutine flowchart showing off speed learn correction processing in initial learn in the flowchart of FIG. 26.
Figure 34:
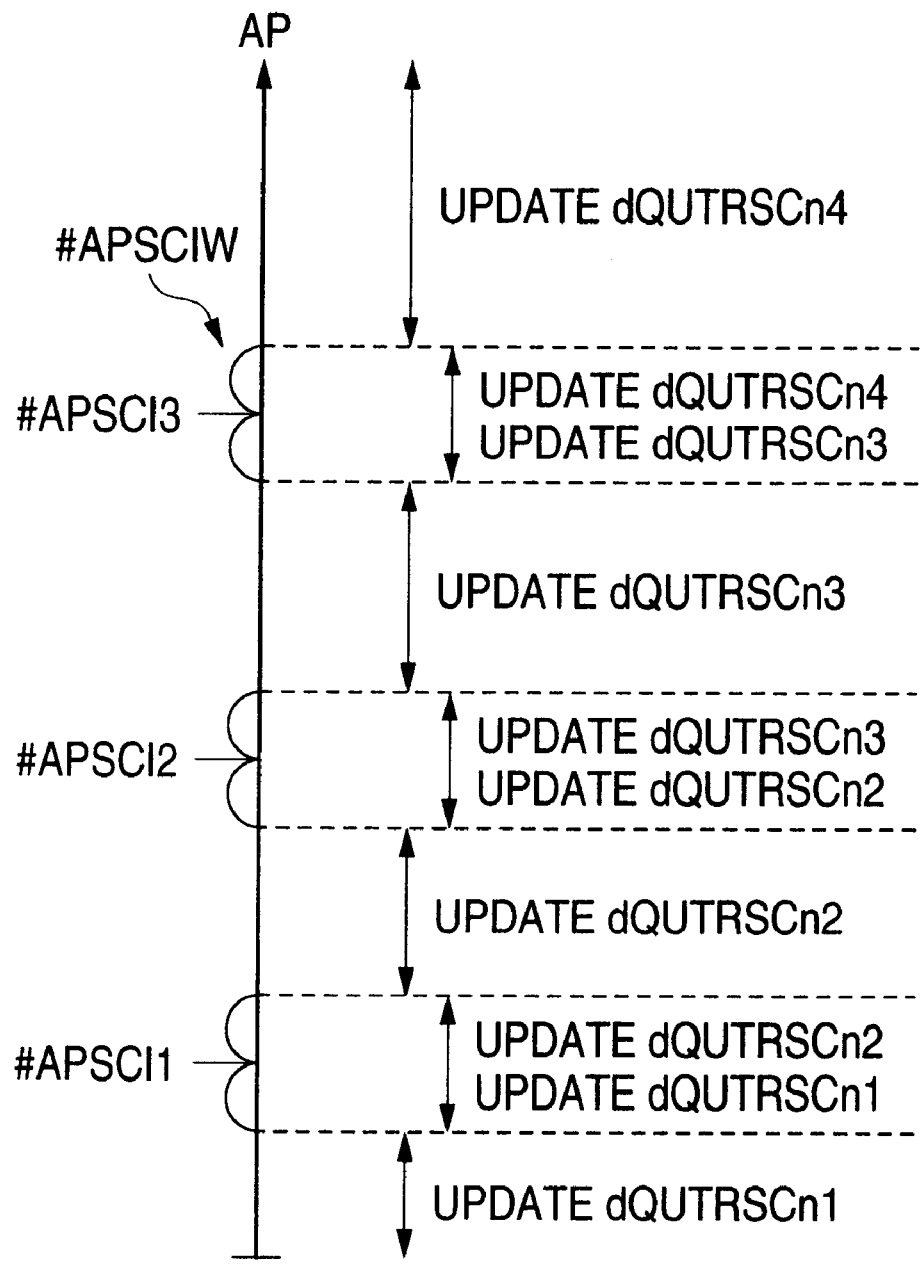
FIG. 34 is a graph to describe processing in the flowchart of FIG. 33.

FIG. 33 is a subroutine flowchart showing the off speed learn correction processing.

In FIG. 33, an off speed correction learn coefficient #dQUTRSP (fixed value, step amount) is replaced with value dq. Next, the program proceeds to S1802 and whether or not the bit of the flag F.TATFSH is set to 1, in other words, the oil temperature is high is determined.

If the determination at S1802 is No, the program proceeds to S1804 and as previously described with reference to the flowchart of FIG. 31, whether or not the update reference accelerator opening APSCB is less than the sum of the predetermined value #APSCI1 and the minute value #APSCIW is determined. If the determination at S1804 is Yes, the program proceeds to S1806 and dq is added to update the off speed correction amount learn value dQUTRSC (more particularly, dQUTRSCn1). If the determination at S1804 is No, S1806 is skipped.

Next, the program proceeds to S1808 and whether or not the update reference accelerator opening APSCB is equal to or greater than the result of subtracting the minute value #APSCIW from the predetermined value #APSCI1 and is less than the sum of the predetermined value #APSCI2 and the minute value #APSCIW is determined. If the determination at S1808 is Yes, the program proceeds to S1810 and the value dq is added to update the off speed correction amount learn value dQUTRSC (more particularly, dQUTRSCn2). If the determination at S1808 is No, S1810 is skipped.

Next, the program proceeds to S1812 and whether or not the update reference accelerator opening APSCB is equal to or greater than the result of subtracting the minute value #APSCIW from the predetermined value #APSCI2 and is less than the sum of the predetermined value #APSCI3 and the minute value #APSCIW is determined. If the determination at S1812 is Yes, the program proceeds to S1814 and the value dq is added to update the off speed correction amount learn value dQUTRSC (more particularly, dQUTRSCn3). If the determination at S1812 is No, S1814 is skipped.

Next, the program proceeds to S1816 and whether or not the update reference accelerator opening APSCB is equal to or greater than the result of subtracting the minute value #APSCIW from the predetermined value #APSCI3 is determined. If the determination at S1816 is Yes, the program proceeds to S1818 and the value dq is added to update the off speed correction amount learn value dQUTRSC (more particularly, dQUTRSCn4). If the determination at S1816 is No, S1818 is skipped. If the determination at S1802 is Yes, the program proceeds to S1820 and dq is added to update the value dQUTRSH for high oil temperature.

The processing means updating the off speed correction amount learn values across the two adjacent areas classified according to the accelerator opening like the processing previously described with reference to the flowchart of FIG. 31. Thus, the off speed correction amount learn value can be calculated at S1106, S1108 in FIG. 19 so as to quickly respond to change in the accelerator opening as much as possible.

Returning to the description of the flowchart of FIG. 26, if the determination at S1354 is No, it is determined that the learn mode is the normal learn. Then, the program proceeds to S1362, S1364, S1359, S1360 and the preparation time correction amount learn value, the I-P correction amount learn value, and the off speed correction amount learn value are updated.

If the determination at S1352 is No, the program proceeds to S1366 and whether or not the value of SCMON is D4h is determined. If the determination at S1366 is Yes, it is determined that a contradictory event occurs in which the inertia phase start time is early although the raising of the engine rotation speed occurs. Then, the program proceeds to S1368 and whether or not the bit of the flag F.SCLX is 0 is determined.

If the determination at S1368 is Yes, it is determined that the learn mode is the initial learn. Then, the program proceeds to S1370, S1372, and S1374 and processing similar to that at the previous steps S1356, S1358, and S1360 is performed. If the determination at S1368 is No and it is determined that the learn mode is the normal learn, S1370 and S1372 are skipped and the program proceeds to S1374 and the off speed correction amount learn value is updated.

The above-described processing will be discussed with reference to FIG. 35. In FIG. 35, No. 1 to 8 at the left end of the upper portion of the figure and in the lower portion denote the learn sense results (events) like SCMON described above.

In No. 1, the raising of the engine rotation speed does not occur and the inertia phase start time is also proper and thus the learn values are not updated (corrected). No. 2 corresponds to the case where the determination at S1340 in FIG. 26 is Yes. Since the raising of the engine rotation speed occurs as shown in the lower portion of the figure, the program proceeds to S1342, S1344, and S1346 (or S1342, S1348, and S1350) and the preparation time is prolonged as shown in FIG. 11. At this time, if the learn mode is the initial learn, the learn values are updated in proportion to the degree of the raising;

if the learn mode is the normal learn, the step amount (fixed value, represented as Tstep) is added for updating the learn values.

No. 7 is the case where the determination at S1352 in FIG. 26 is Yes. In this case, steps S1356 to S1360 or steps S1362 to S1360 are executed, whereby both the ON side and the OFF side are corrected.

No. 8 is the case where the determination at S1366 in FIG. 25 is Yes. In this case, steps S1370 to S1374 are executed and the ON side (preparation time and I-P characteristic) and the OFF side (off speed) are corrected at the same time. That is, as shown in FIG. 35, if the raising of the engine rotation speed occurs as the OFF side friction coefficient lowers, etc., it cannot be canceled simply by making an ON side correction. Therefore, if a symptom of the raising of the engine rotation speed and a symptom of inter lock occur at the same times as in No. 8, the OFF side off speed is adjusted. Accordingly, even if such a contradictory event occurs, the raising of the engine rotation speed can be canceled effectively.

Further, the feature of the embodiment will be discussed.

Figure 36:
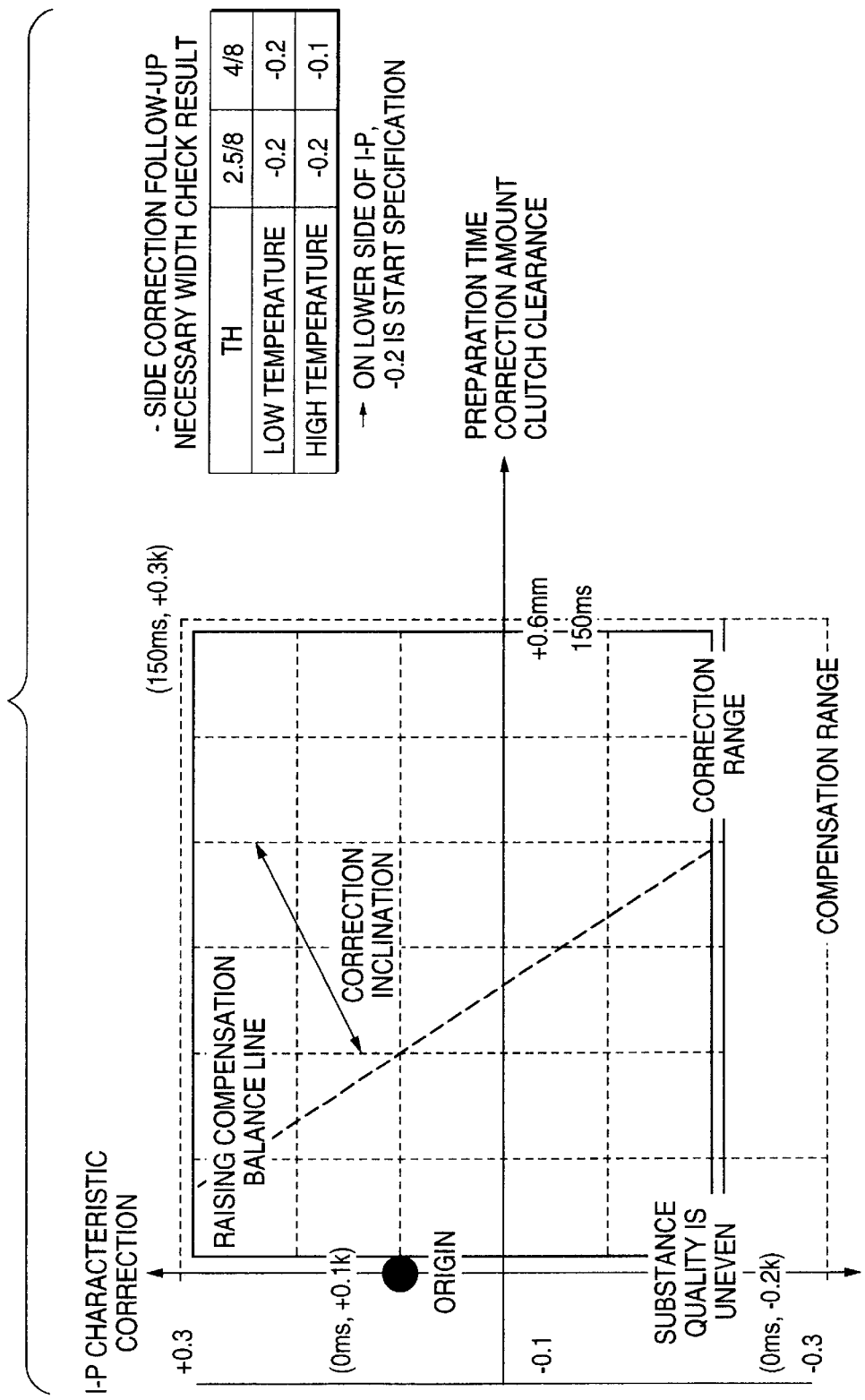
FIG. 36 is a schematic representation to describe processing in the flowchart of FIG. 26.

In the embodiment, the clutch clearance on the safety side relative to the compensation range is set to 0 to 0. 6 mm (equivalent to 150 msec), I-P: −0.2 to +0.3 kgf/cm$^2$, and the initial value of the I-P correction amount learn value relative to preparation time correction amount learn value 50 msec is set to (ratio) of 0 kgf/cm$^2$ as shown in FIG. 36. The origin of the learn value is set to 0 msec, +0.1 kgf/cm$^2$ so that the raising of the engine rotation speed does not occur at the factory shipment.

That is, if the raising of the engine rotation speed occurs, the possible factor is a shortage of the preparation time, a low hydraulic pressure on the ON side, etc.; it is difficult to determine the factor is caused by means of an increase in the clutch clearance more than the setup value, a shift of control signal and actual supplied hydraulic pressure from initial characteristic, and both.

The convergence state of learning was checked while both correction amounts (correction amount balance) were changed in various manners for the case of different clutch clearance, the case of different shift of control signal and actual supplied hydraulic pressure, etc., as initial values.

Figure 37:
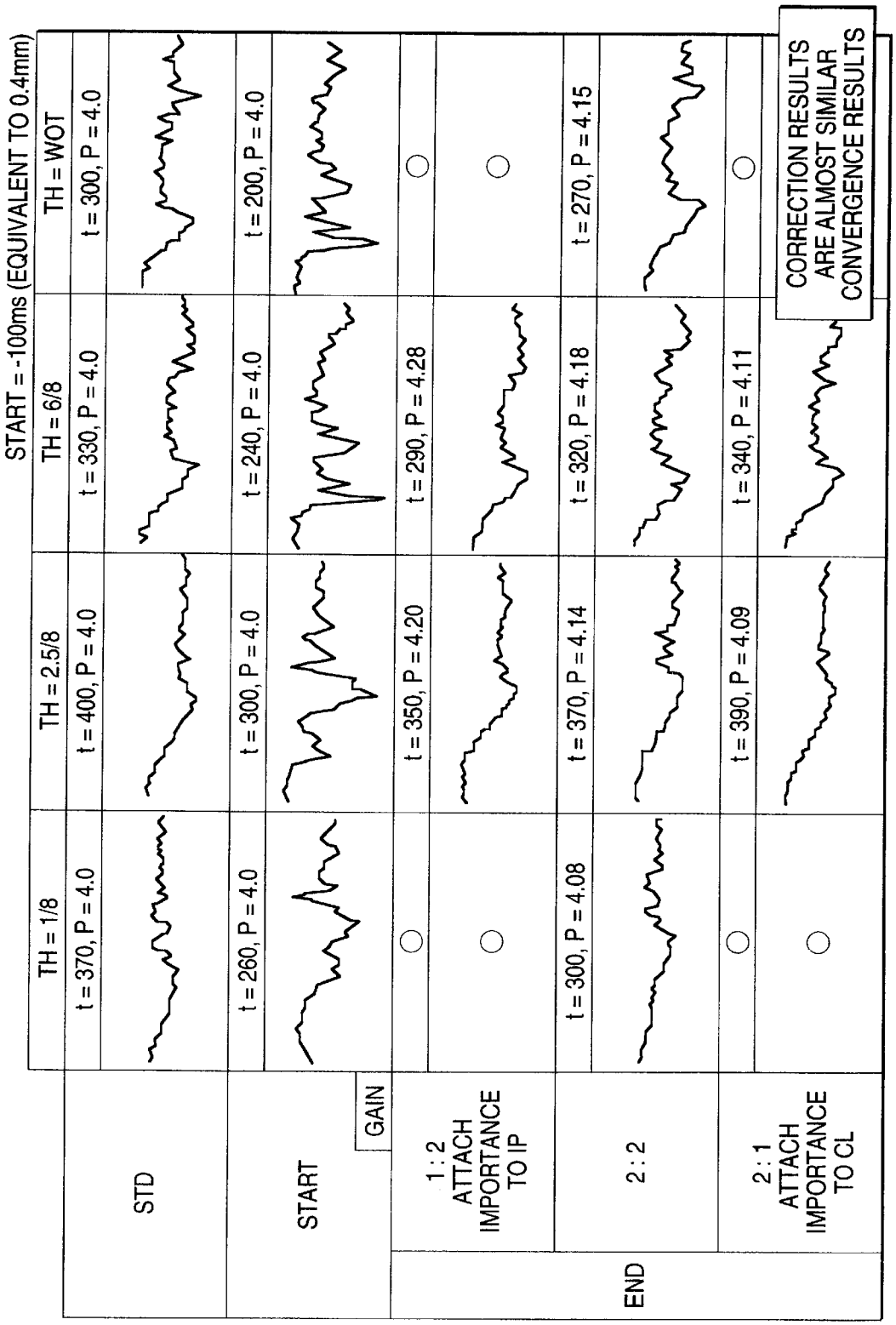
FIG. 37 is a data drawing showing the result of test conducted to determine balance between clutch clearance correction and I-P correction.
Figure 38:
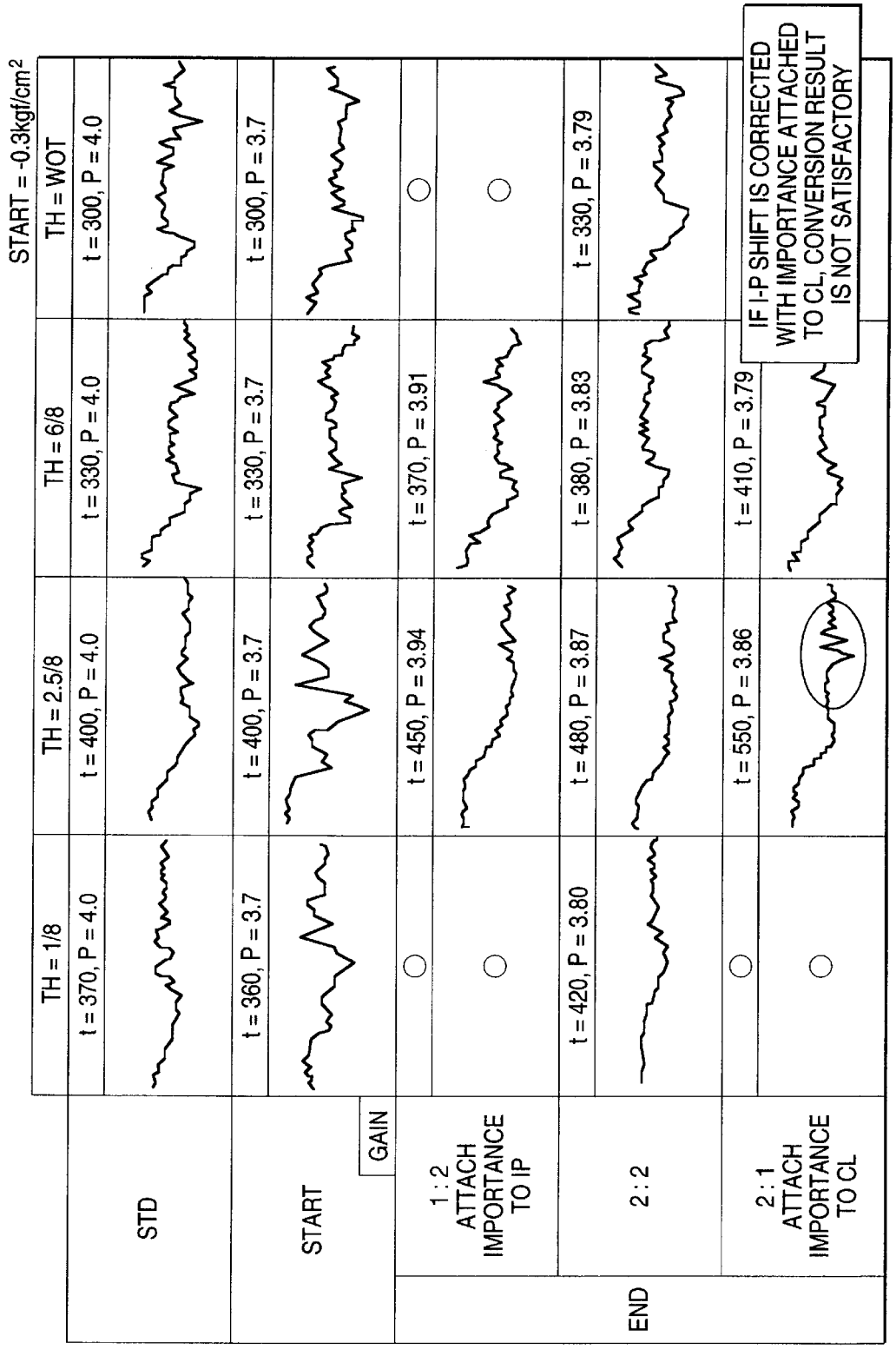
FIG. 38 is a data drawing showing the result of test conducted to determine balance between clutch clearance correction and I-P correction.

Specifically, the initial condition was −100 msec in a test the result of which is shown in FIG. 37 and the initial condition was −0.3 kgf/cm² in a test the result of which is shown in FIG. 38. In the case shown in FIG. 37, the correction results were almost similar convergence results, but in the case shown in FIG. 38, satisfactory convergence results cannot be provided.

Figure 39:
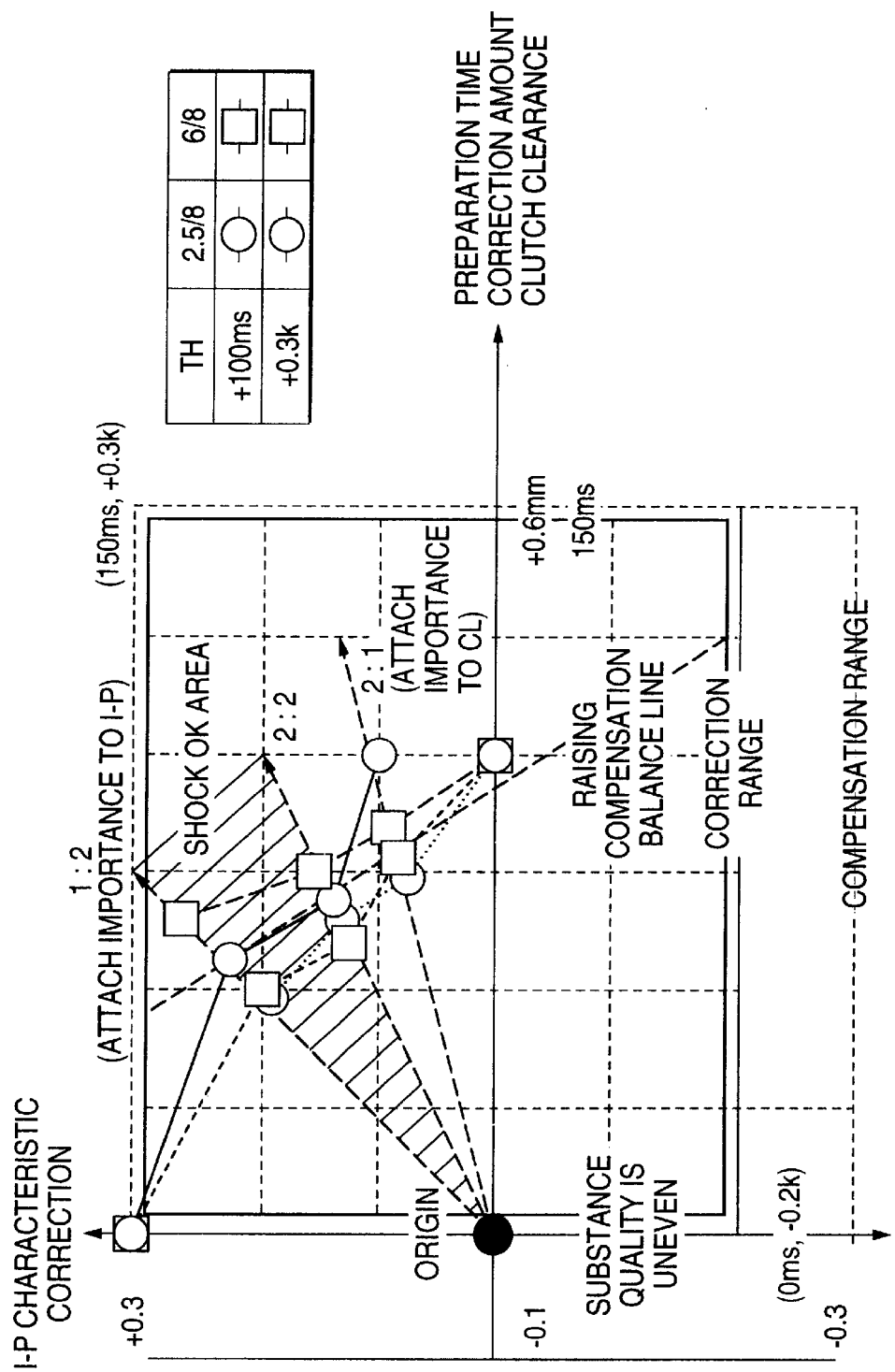
FIG. 39 is a schematic representation showing the initial values of the clutch clearance correction and I-P correction determined through the tests shown in FIGS. 37 and 38.

That is, a correction was made so as to become within the hatched region defined by an appropriate distribution ratio of 1:2, 2:2, or the like with importance attached to the I-P characteristic, as shown in FIG. 39. That is, qualitatively importance is attached to the hydraulic pressure. The possible reason why satisfactory results cannot be provided when 2:1 was set with importance attached to the clutch clearance (preparation time) as shown in the figure is that shortage of the hydraulic pressure cannot be corrected based on the time (clutch clearance) although shortage of the clutch clearance can be corrected based on the hydraulic pressure.

Returning to the description of the flowchart of FIG. 26, if the determination at S1366 is No, the program proceeds to S1376 and whether or not the value of SCMON is 98h is determined. If the determination at S1376 is Yes, it is determined that the inertia phase start time is late. Then, the program proceeds to S1378 and whether or not the bit of the flag F.SCLX is 0 is determined. If the determination at S1378 is No and it is determined that the learn mode is the normal learn, the program proceeds to S1380 and the I-P correction amount learn value is updated as at the previously step S1350.

On the other hand, if the determination at S1378 is Yes and it is determined that the learn mode is the initial learn, S1380 is skipped. If the determination at S1376 is No, the program proceeds to S1382 and whether or not the value of SCMON is 94h is determined. If the determination at S1382 is Yes, it is determined that the inertia phase start time is early. Then, the program proceeds to S1384 and S1386 and similar processing to that at the previous steps S1348 and S1350 is performed.

Next, the program proceeds to S1388 and learn mode transition determination is made for determining whether or not a transition is to be made from the initial learn to the normal learn.

Figure 40:
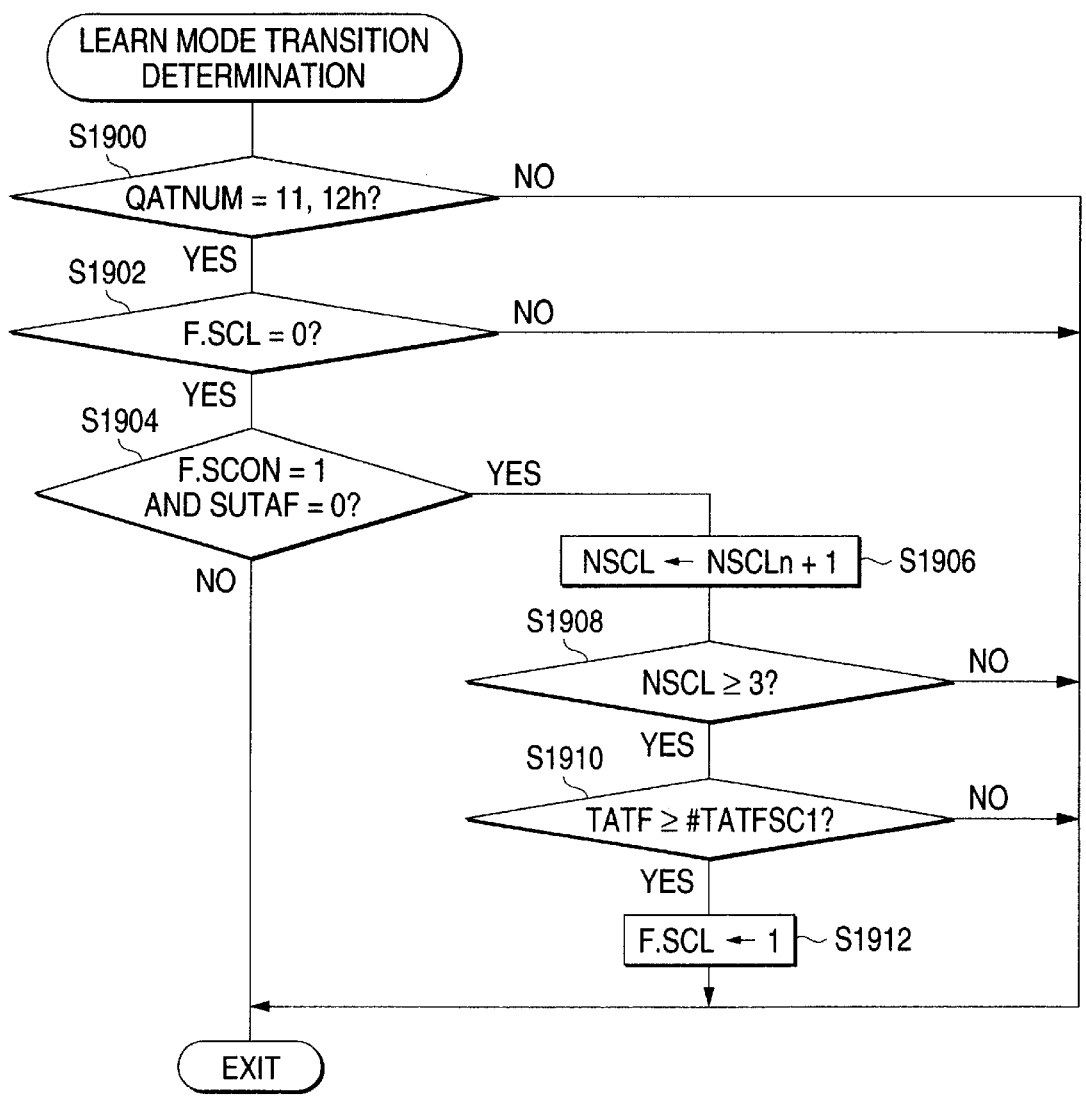
FIG. 40 is a subroutine flowchart showing learn mode transition determination processing in the flowchart of FIG. 26.

FIG. 40 is a subroutine flowchart showing the learn mode transition determination processing.

In FIG. 40, at S1900, whether or not QATNUM=11h or 12h is determined. If the determination at S1900 is No, the subsequent steps are skipped; if the determination at S1900 is Yes, the program proceeds to S1902 and whether or not the bit of the flag F.SCL is set to 0 is determined.

If the determination at S1902 is No, the transition to the normal learn mode is already made and thus the subsequent steps are skipped. If the determination at S1902 is Yes, the program proceeds to S1904 and the bit of the flag F.SCON is set to 1 and whether or not the value of raising counter SUTAF is 0 is determined.

If the determination at S1904 is No, the subsequent steps are skipped. If the determination at S1904 is Yes, the program proceeds to S1906 and the value of an initial learning OK counter NSCL is incremented. Then, the program proceeds to S1908 and whether or not the value of the counter is equal to or greater than 3 is determined. If the determination at S1908 is No, the subsequent steps are skipped. If the determination at S1908 is Yes, the program proceeds to S1910 and whether or not the detected oil temperature TATF is equal to or greater than the predetermined value #TATFSC1 is determined.

If the determination at S1910 is No, the subsequent steps are skipped. If the determination at S1910 is Yes, the program proceeds to S1912 and the bit of the flag F.SCL is set to 1 and the transition to the normal learn mode is made. If the installed battery is removed, again the flag is reset to 0 in routine (not shown) for restoring the learn mode to the initial learn, as described above.

In the embodiment, as described above, hydraulic pressure learn correction and time learn correction are made based on the predetermined correction ratio, so that the learn progress state can be reliably converged toward the target level and therefore raising of the rotation speed of the internal combustion engine can be canceled effectively.

Specifically, the embodiment is configured as follows: The shift control apparatus of an automatic transmission (transmission T) for a vehicle, comprising a plurality of frictional engagement elements (clutches Cn) driven by electromagnetic solenoids (shift solenoids SLn) wherein hydraulic pressure is applied to the frictional engagement element on the engagement side and hydraulic pressure is discharged from the frictional engagement element on the release side for shifting output of an internal combustion engine (engine E) comprises hydraulic pressure control means (ECU 80, S22, S102, S208 to S222, and S400 to S410) for, at predetermined shifting time (upshift time), outputting preparation hydraulic pressure (QATON) based on preparation hydraulic pressure (preparation pressure QDB1A) previously stored in the frictional engagement element on the engagement side and previously stored preparation time (TMDB1A) and next outputting engagement hydraulic pressure (QATON) based on previously stored engagement hydraulic pressure characteristic relative to the target hydraulic pressure, raising occurrence detection means (ECU 80, S22, S106, and S1200 to S1224) for determining whether or not the raising of the rotation speed occurs in the internal combustion engine before the time an inertia phase starts, and learn correction means (ECU 80, S22, S102, S106, S406 to S408, and S900 to S902) for making a hydraulic pressure learn correction to the preparation hydraulic pressure and the engagement hydraulic pressure and a time learn correction to the preparation time at the next predetermined shifting time when the raising occurrence detection means detects the raising of the rotation speed of the internal combustion engine, wherein the learn correction means makes the hydraulic pressure learn correction and the time learn correction based on a predetermined correction ratio.

The predetermined correction ratio is a predetermined correction ratio relative to the energization-hydraulic pressure characteristic of the electromagnetic solenoid and clearance of the frictional engagement element.

In the first aspect of the invention, the learn correction means is provided for making a hydraulic pressure learn correction to the preparation hydraulic pressure and the engagement hydraulic pressure and more particularly a hydraulic pressure learn correction to the hydraulic pressure height and a time learn correction to the preparation time and more particularly a time learn correction to the duration of the preparation time at the next predetermined shifting time when raising of the rotation speed of the internal combustion engine is detected. The learn correction means makes the hydraulic pressure learn correction and the time learn correction based on the predetermined correction ratio, so that the learn progress state can be reliably converged toward the target level and therefore the raising of the rotation speed of the internal combustion engine can be canceled effectively.

In the second aspect of the invention, since the predetermined correction ratio is a predetermined correction ratio relative to the energization-hydraulic pressure characteristic of the electromagnetic solenoid and clearance of the frictional engagement element, the initial manufacturing variations and secular change in clearance of the frictional engagement element (clutch) can be corrected based on the duration of the preparation time and shift of a control signal and the actual supplied hydraulic pressure can be corrected based on the height of the hydraulic pressure; the learn progress state can be reliably converged toward the target level and therefore raising of the rotation speed of the internal combustion engine can be canceled effectively.

While only certain embodiments of the invention have been specifically described herein, it will apparent that numerous modifications may be made thereto without departing from the spirit and scope of the invention.

What is claimed is:

1. A shift control apparatus of an automatic transmission for a vehicle, including a plurality of frictional engagement elements driven by electromagnetic solenoids wherein hydraulic pressure is applied to the frictional engagement element on the engagement side and hydraulic pressure is discharged from the frictional engagement element on the release side, for shifting an output of an internal combustion engine, said shift control apparatus comprising:

hydraulic pressure control means outputting, at a predetermined shifting time, a preparation hydraulic pressure in the frictional engagement element on the engagement side based on a preparation hydraulic pressure previously stored and a previously stored preparation time, and then outputting an engagement hydraulic pressure in the frictional engagement element on the engagement side toward a target hydraulic pressure based on a previously stored engagement hydraulic pressure characteristic;

raising occurrence detection means determining whether or not the raising of the rotation speed occurs in the internal combustion engine before an inertia phase starts; and learn correction means performing a hydraulic pressure learn correction to the preparation hydraulic pressure and the engagement hydraulic pressure and a time learn correction to the preparation time at the next predetermined shifting time when said raising occurrence detection means detects the raising of the rotation speed of the internal combustion engine, wherein said learn correction means performs the hydraulic pressure learn correction and the time learn correction based on a predetermined correction ratio.

2. The shift control apparatus of an automatic transmission for a vehicle according to claim 1, wherein the predetermined correction ratio is a predetermined correction ratio between the energization-hydraulic pressure characteristic of the electromagnetic solenoid and the clearance of the frictional engagement element.

* * * * *